(12) United States Patent
Ryu et al.

(10) Patent No.: US 8,494,594 B2
(45) Date of Patent: Jul. 23, 2013

(54) METHOD FOR CONTROLLING POWER SAVING MODE OF UE IN THE MOBILE COMMUNICATION SYSTEM

(75) Inventors: Ki Seon Ryu, Anyang-si (KR); Yong Ho Kim, Anyang-si (KR); Jeong Ki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 694 days.

(21) Appl. No.: 12/526,377

(22) PCT Filed: Feb. 11, 2008

(86) PCT No.: PCT/KR2008/000780
§ 371 (c)(1),
(2), (4) Date: Aug. 7, 2009

(87) PCT Pub. No.: WO2008/097060
PCT Pub. Date: Aug. 14, 2008

(65) Prior Publication Data
US 2010/0323647 A1    Dec. 23, 2010

(30) Foreign Application Priority Data

| Feb. 9, 2007 | (KR) | 10-2007-0013808 |
| Sep. 21, 2007 | (KR) | 10-2007-0097043 |
| Oct. 9, 2007 | (KR) | 10-2007-0101439 |

(51) Int. Cl.
*H04M 1/00* (2006.01)

(52) U.S. Cl.
USPC ............... 455/574; 455/127.5; 455/343.1; 370/311

(58) Field of Classification Search
USPC .......... 455/127.1, 127.5, 343.1, 550.1, 572, 455/574; 370/311, 328, 338
See application file for complete search history.

(56) References Cited

U.S. PATENT DOCUMENTS

| 2006/0281436 A1* | 12/2006 | Kim et al. | 455/343.2 |
| 2007/0298836 A1* | 12/2007 | Yanover | 455/552.1 |
| 2008/0043619 A1* | 2/2008 | Sammour et al. | 370/231 |
| 2008/0075026 A1* | 3/2008 | Son et al. | 370/311 |

FOREIGN PATENT DOCUMENTS

| WO | WO-2005/064952 A1 | 7/2005 |
| WO | WO-2006/040769 A1 | 4/2006 |

OTHER PUBLICATIONS

Zhang, H. et al.: "Short Data Burst Support for MSS in Sleep Mode", IEEE 802.16 Broadband Wireless Access Working Group, IEEE C802.16e-04/299r2, Aug. 30, 2004 [retrieved on Jul. 13, 2009] <RUL:http://www.ieee802.org/16/tge/contrib/C80216e-04_299r2.pdf>.

* cited by examiner

*Primary Examiner* — Nhan Le
(74) *Attorney, Agent, or Firm* — Birch, Stewart, Kolasch & Birch, LLP

(57) ABSTRACT

A method for controlling, a power saving mode of a mobile station (MS) in a mobile communication system is disclosed. The method differently defines operations of power saving modes of individual cases in association with message traffic distinguished from user traffic of a service, so that it can effectively reduce power consumption of the mobile station (MS). Firstly, the listening window of the power saving mode is used. Secondly, a method for transmitting a request message for pending the sleep mode is used. If the sleep-mode pending is requested, the sleep-mode resume message may be used in the case of a reactivation, or the reactivation can be automatically performed if a current time reaches a predetermined time.

7 Claims, 15 Drawing Sheets

METHOD FOR CONTROLLING POWER SAVING MODE OF UE IN THE MOBILE COMMUNICATION SYSTEM

TECHNICAL FIELD

The present invention relates to a mobile communication system, and more particularly to a method for controlling a power saving mode of a user equipment (UE) in a mobile communication system.

BACKGROUND ART

A user equipment (UE) and a service base station operate power saving modes of individual connections based on service types, so that an amount of power consumption of the user equipment (UE) can be minimized. The term "Power Saving Class" is the power saving mode operation scheme defined by considering characteristics of individual traffics in the service types.

Each power saving class includes a sleep window and a listening window according to traffic characteristics based on the service types. For example, if a specific service connection generates irregular traffic data (e.g., Best Effort or non-real-time service traffic) and an irregular data transfer rate, the specific service connection is coupled to the power saving class composed of a constant listening window and an exponentially-increasing sleep window, which is then operated. On the other hand, another service connection (e.g., a real-time service or a Voice over IP (VoIP)) is coupled to another power saving class composed of a constant listening window and a constant sleep window.

In the case of the user equipment (UE) currently operated under the power saving mode defined in each power saving class, an activated power saving class may be deactivated by traffic generated in a corresponding connection, the user equipment (UE) sets an initial sleep window to a start sleep window in order to re-activate the corresponding power Saving class after completing traffic transmission.

Provided that the user equipment (UE) is operated under the power saving mode of the power saving class defined by consideration of individual traffic characteristics, if the activated class is terminated by the necessity of transmission of data irrelevant to the corresponding traffic and then restarts its operation, the advantages of using the individual power saving classes are useless, resulting in the occurrence of system inefficiency.

For example, in the case of non-real-time traffic data, if the traffic occurs once, the probability of successively generating the same service traffic is very high. If the traffic does not occur for at least a predetermined period of time, the probability of generating the corresponding traffic is gradually decreased as time goes by.

If the user equipment (UE) must deactivate the power saving class to transmit traffic data distinguished from the corresponding traffic when it is currently operated under the power saving mode based on the power saving class defined by consideration of the above-mentioned characteristics, the user equipment (UE) must be re-operated under the power saving mode of the initial sleep window although the occurrence of the corresponding traffic is not maintained for a long period of time.

And, the user equipment (UE) requires a long period of time until reaching the sleep window before the power saving class is deactivated. Transmission connections are connected to the same power saving class although they have different characteristics to transmit data distinguished from provided service traffic, and the power saving class must be deactivated and be then re-activated to transmit data distinguished from the above-mentioned traffic, the sleep window from the initial sleep window must be increased, resulting in reduction of the power saving effect.

DISCLOSURE

Technical Problem

Accordingly, the present invention is directed to a method for controlling a power saving mode of a user equipment (UE) in a mobile communication system that substantially obviates one or more problems due to limitations and disadvantages of the related art.

An object of the present invention is to provide a power control method with an improved performance.

Another object of the present invention is to provide a power control method for differently defining operations of power saving modes associated with individual cases of message traffic distinguished from user traffic of a provision service, thereby effectively reducing power consumption of a user equipment (UE).

Additional advantages, objects, and features of the invention will be set forth in part in the description which follows and in part will become apparent to those having, ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for controlling a power saving mode in a wireless access system, the method comprising: activating a power saving class to start a sequence of a sleep window and a listening window according to the class and if traffic transmission is needed, transmitting the traffic during the sleep window without termination of the power saving mode, wherein the power saving class is defined in consideration of characteristics of connection associated with at least one service.

The traffic may be a Media Access Control (MAC) control message traffic.

The power saving class may be defined in consideration of characteristics of transport connection and management connection which are associated with at least one service.

The method may further comprise: Transmitting/receiving a traffic during the listening window of the power saving class.

If traffic transmission is needed, the traffic may be transmitted during the listening window without termination of the power saving mode wherein the listening window is extended until the traffic transmission/reception is completed.

The listening window may be extended until an acknowledgement (ACK) signal associated with the traffic transmission is received.

If traffic transmission is needed, the traffic may be transmitted by temporarily deactivating the power saving class without termination or tree power saving moue.

The method may further comprise: transmitting a first request message for pending the power saving class including a pending code and transmitting a second request message for reactivating the power saving class including a reactivation code.

The method may further comprise: receiving an acknowledgement message for reception at least one of the first request message and the second request message.

In another aspect of the present invention, there is provided a method for controlling a power saving mode in a wireless access system, the method comprising: activating a power saving class to start a sequence of a sleep window and a listening window according to the class and if traffic transmission is needed, transmitting the traffic during the listening window extended until the traffic transmission/reception is completed without termination of the power saving mode.

In another aspect of the present invention, there is provided a method for controlling a power saving mode in a wireless access system, the method comprising: activating a power saving class to start a sequence of a sleep window and a listening window according to the class, if traffic transmission is needed, transmitting a first request message for pending the power saving class including a pending code, transmitting the traffic without termination of the power saving mode, transmitting a second request message for reactivating the power saving class including a reactivation code and reactivating the power saving class according to the reactivation code.

In another aspect of the present invention, there is provided a method for controlling a power saving mode in a wireless access system, the method comprising: activating a power saving class to start a sequence of a sleep window and a listening window according to the class, if traffic transmission is needed, transmitting a first request message for pending the power saving class including a pending code and a reactivation time information, transmitting the traffic without termination of the power saving mode and reactivating the power saving class after the lapse of a predetermined time according to the reactivation time information.

The reactivation time information may be a frame information to start the reactivating.

The reactivation time information may be a number of sleep windows information to maintain the pending of the power saving class.

In another aspect of the present invention, there is provided a method for controlling a power saving mode in a wireless access system, the method comprising: activating a power saving class to start a sequence of a sleep window and a listening window according to the class, receiving a message including control information for the power saving class in a header of the message and pending the power saving class according to the control information and transmitting a predetermined message without termination of the power saving mode.

It is to be understood that both the foregoing general description and the following detailed description of the present invention are exemplary and explanatory and are intended to provide further explanation of the invention as claimed.

Advantageous Effects

The present invention differently defines operations of power saving modes of individual cases by discriminating traffic categories, so that it can effectively reduce power consumption of a user equipment (UE).

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
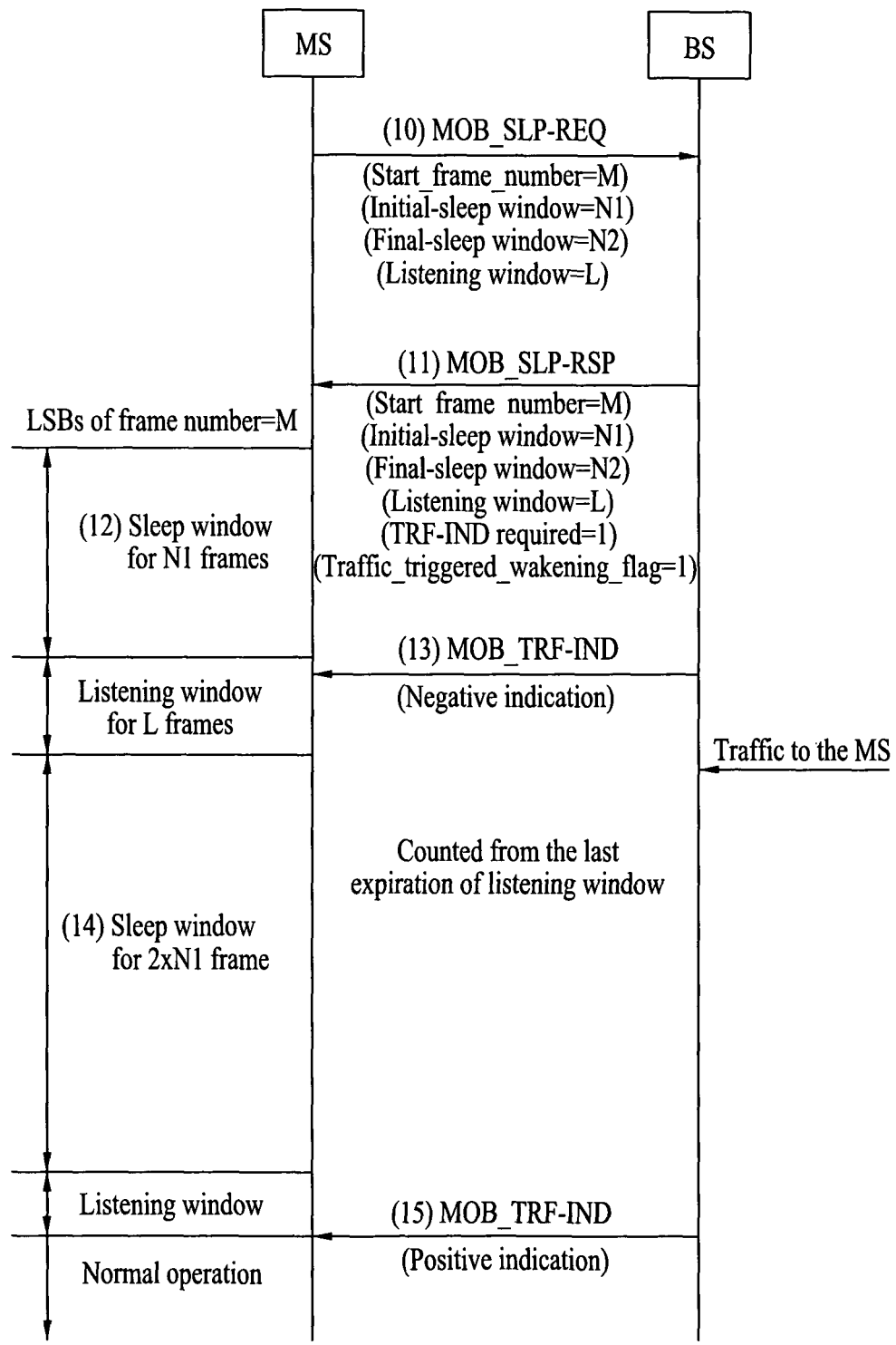
FIG. 1 is a conceptual diagram illustrating operations of a Power Saving Mode Class of type 1 according to the present invention.

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

The following description will disclose that embodiments of the present invention are executed in a broadband wireless access system based on the IEEE802.16 system. A method for supporting the power saving mode in the broadband wireless access system based on the IEEE802.16 system will hereinafter be described in detail.

The IEEE802.16-based broadband wireless access system supports the power saving mode to minimize power consumption of a mobile station (MS). The mobile station (MS) is operated under the power saving mode by repetition of a sleep window and a listening window. The length of the sleep window determined by a sleep window value and the length of the listening window determined by a listening window value have different values according to traffic characteristics prescribed in a corresponding mobile station (MS). Therefore, the mobile station (MS) may have the following three power saving classes:

Power Saving Mode Class of type 1
Power Saving Mode Class of type 2
Power Saving Mode Class of type 3.

The Power Saving Mode Class of type 1 is a class for a non-real-time variable rate (nrt-VR) service of which transfer rate is changed or a Best Effect (BE) having conventional Internet traffic characteristics. The Power Saving Mode Class of type 1 is operated by defining an initial sleep window, a final window base, a final window exponent, a listening window, and a start frame number for a sleep window.

The Power Saving Mode Class of type 2 is a class for a VoIP service or a real-time variable rate (rt-VR) service of which transfer rate is changed. The Power Saving Mode Class of type 2 is operated by defining an initial sleep window, a listening window, and a start frame number for a sleep window.

The Power Saving Mode Class of type 3 is a class for a management message (e.g., DCD/UCD and MOB_NBR-ADV) which must be periodically transmitted to mobile station (MS) in a power saving mode or multicast-transmission data. The Power Saving Mode Class of type 3 is operated by defining a final window base, a final window exponent, and a start frame number for a sleep window.

If the mobile station (MS) is operated under the power saving mode of each power saving class, this MS operation indicates that the power saving class is activated or the power saving mode is activated. In this way, if the mobile station (MS) is not operated under the power saving mode of each power saving class, this MS operation indicates that the power saving class is deactivated or the power saving mode is deactivated.

In order to exchange information of operations of individual classes under the above-mentioned power saving mode, the following three messages can be basically used.

A sleep request message (MOB-SLP-REQ) is shown in the following Table 1:

TABLE 1

| Syntax Size | Notes |
|---|---|
| MOB_SLP-REQ_Message_format( ) { | |
|   Management message type = 50 8bits | |
|   Number of Classes 8bits | Number of power saving classes. |
|   for (i=0; i < Number of Classes; i++) { | |
|     Definition 1bit | |
|     Operation 1bit | |
|     Power_Saving_Class_ID 6bits | |
|   if (Operation = 1)|{ | |
|     Start_frame_number 6bits | |
|     Reserved 2bits | |
|     } | |
|     if (Definition = 1) { | |
|     Power_Saving_Class_Type 2bits | |
|     Direction 2bits | |
|   Traffic_triggered_wakening_flag 1bit | |
|     Reserved 3bits | |
|     initial-sleep window 8bits | |
|     listening-window 8bits | |
|     final-sleep window base 10 bits | |
|     final-sleep window exponent 3bits | |
|     Number_of_CIDs 3bits | |
|     for (i=0; i<Number_of_CIDs; i++ { | |
|       CID 16 bits | |
|     } | |
|   } | |
|   TLV encoded information variable | |
| } | |

Table 1 shows exemplary MAC control messages for requesting a sleep-mode including a sleep window and a listening window. The MAC control messages of Table 1 are transmitted to the service base station (BS) by a mobile station (MS). As described above, Table 1 shows information of an initial sleep window, information of a final window base, information of a final window exponent, information of a listening window, and information of a start frame number of a sleep window.

A sleep response message (MOB-SLP-RSP) is shown in the following Table 2:

TABLE 2

| Syntax | Size | Notes |
|---|---|---|
| MOB_SLP-RSP_Message_format( ) { | | |
| Management message type = 51 | 8 bits | |
| Number of Classes | 8 bits | Number of power saving classes. |
| for (i = 0; i < Number_of_Classes; i++) { | | |
| Length of Data | 7 bits | |
| Sleep Approved | 1 bit | |
| Definition | 1 bit | |
| Operation | 1 bit | |
| Power_Saving_Class_ID | 6 bits | |
| if (Sleep Approved == 1) { | | |
| if (Operation = 1) { | | |
| Start_frame_number | 6 bits | |
| Reserved | 2 bits | |
| } | | |
| if (Definition = 1) { | | |
| Power_Saving_Class_Type | 2 bits | |
| Direction | 2 bits | |
| initial-sleep window | 8 bits | |
| listening window | 8 bits | |
| final-sleep window base | 10 bits | |

TABLE 2-continued

| Syntax | Size | Notes |
|---|---|---|
| final-sleep window exponent | 3 bits | |
| TRF-IND required | 1 bit | |
| Traffic_triggered_wakening_flag | 1 bit | |
| Reserved | 1 bit | |
| if (TRF-IND required) { | | |
| SLPID | 10 bits | |
| Reserved | 2 bits | |
| } | | |
| Number_of_CIDs | 4 bits | |
|     for (i = 0; i < Number_of_CIDs; i++) { | | |
| CID | 16 bits | |
|     } | | |
|     if (MDHO or FBSS capability enabled) { | | if MDHO or FBSS capability is enabled in the REG-REQ/RSP message exchange. |
|         Maintain Diversity Set and Anchor BS | 1 bit | |
|         if (Maintain Diversity Set and Anchor BS) { | | |
|             MDHO/FBSS duration (s) | 3 bits | |
| } | | |
| } | | |
| } | | |
| Padding | variable | if needed for alignment to byte boundary |
| } else { | | in case Sleep Approved == 0 |
| REQ-duration | 8 bits | |
| } | | |
| TLV encoded information | variable | |
| } | | |

Table 2 shows exemplary MAC control messages transmitted from the service base station (BS) to the mobile station (MS). As shown in Table 2, the service base station (BS) transmits the MOB-SLP-RSP message to the mobile station (MS) to determine whether the sleep mode is permitted or not, and transmits information associated with a sleep mode (e.g., a listening window or a sleep ID).

A traffic indication message (MOB-TRF-IND) is shown in the following Table 3:

TABLE 3

| Syntax | Size | Notes |
|---|---|---|
| MOB_TRF-IND_Message_format( ) { | — | — |
| Management message type = 52 | 8 bits | — |
| FMT | 1 bit | — |
| if (F MT == 0) { | — | — |
| SLPID Group Indication bit-map | 32 bits | N-th bit of SLPID-Group indication bit-map MSB corresponds to N = 0] is allocated to SLPID Group that includes MS with SLPID values from N * 32 to N * 32 + 31 Meaning of this bit 0: There is no traffic for all the 32 MS that belong to the SLPID-Group 1: There is traffic for at least one MS in SLPID-Group. |
| Traffic Indication Bitmap | variable | Traffic Indication bit map comprises the multiples of 32-bit long Traffic Indication unit. A Traffic Indication unit for 32 SLPIDs is added to MOB_TRF-IND message whenever its SLPID Group is set to 1 32 bits of Traffic Indication Unit (starting from MSB) are allocated to MS in the ascending order of their SLPID values: 0: Negative indication 1: Positive indication |
| } else { | — | — |
| Num Pos | 8 bits | Number of CIDs following |
| for (i=0; i<Num_Pos; i++) { | — | — |
| SLPIDs | 10 bits | — |
| } | | |
| } | — | — |
| Padding | variable | If needed, for alignment to byte boundary. |
| TLV encoded items | variable | — |
| } | — | — |

Table 3 shows exemplary broadcast-formatted MOD-TRF-IND messages transmitted at windows of a predetermined time. The mobile station (MS) in sleep-mode receives the MOD-TRF-IND message during a listening window, recognizes information indicating the presence or absence of downlink traffic for the MS itself on the basis of the received MOD-TRF-IND message, and determines whether the sleep mode will be continuously maintained or will receive downlink data after closing the sleep mode according to the recognized information.

The mobile station (MS) and the base station (BS) may use additional messages to activate or deactivate the pre-defined power saving class, or may include necessary indication information in a header or sub-header of a MAC PDU, so that a conventional header may be extended as necessary. For example, a sleep control header can be used in an uplink may use, and a sleep control extended sub-header can be used in an downlink may use.

The following Table 4 shows examples of the above-mentioned uplink sleep control header:

TABLE 4

| Name | Length (bits) | Description |
|---|---|---|
| Type | 3 | The type of Bandwidth request and uplink sleep control header is defined in Table 5a. |
| BR | 11 | Bandwidth Request: The number of bytes of up link bandwidth requested by the MS. The bandwidth request is for the CID. The request shall not include any PHY overhead. It is incremental BW request. |
| Power_Saving_Class_ID | 6 | Power Saving Class ID. |
| Operation | 1 | 1: to activate Power Saving Class. 0: to deactivate Power Saving Class. |
| Reserved | 1 | Shall be set to zero. |
| CID | 16 | Basic CID of the MS for which the bandwidth request and uplink sleep control header is sent. |
| HCS | 8 | Header Check Sequence (same usage as HCS entry in Table 5). |

As described above, a Power_Saving_Class_ID field and an operation field are contained in the header of Table 4, so that information for the sleep mode may be transmitted.

The following Table 5 shows examples of the above-mentioned downlink sleep control extended sub-header:

TABLE 5

| Name | Size | Description |
|---|---|---|
| Power_Saving_Class_ID | 6 bits | Indicates the Power Saving Class ID to which this command refers |
| Operation | 1 bit | 1 = activate Power Saving Class<br>0 = de-activate Power saving Class |
| Final_Sleep_Window_Exponent | 3 bits | For PSC type III only: assigned factor by which the Final-sleep window base is multiplied in order to calculate the duration of single sleep window requested by the message. |
| Final_Sleep_Window_Base | 7 bits | For Power Saving Class Type III only: the base for duration of single sleep window requested by the message. |
| Stop_CQI_Allocation_Flag | 1 bit | 1 = Any CQICH allocations to this MS are cancelled.<br>0 = CQICH allocations to this MS are still allocated and the MS shall continue to transmit channel quality information on them during its availability intervals. |
| Start frame | 6 bits | 6 LSB of frame number to start activation of PSC. |

As described above, a Power_Saving_Class_ID field, an Operation field, a Final_Sleep_Window_Exponent field, and a Final_Sleep_window_Base field are contained in the extended sub-header of Table 5, so that information for the sleep mode can be transmitted.

FIG. 1 is a conceptual diagram illustrating operations of a Power Saving Mode Class of type 1.

In more detail, in the case of the Power Saving Mode Class of type 1 of FIG. 1, the mobile station (MS) requests an activation of a power saving class from the base station (BS). In this case, if downlink traffic occurs in a corresponding mobile station (MS), the power saving class is deactivated. Detailed descriptions of individual operations (10)~(15) are as follows.

Operation (10)

The mobile station (MS) establishes a variety of values (e.g., an initial sleep window, a final sleep window, and a listening window), transmits the established values to the base station (BS), and request an activation of the power saving class from the base station (BS). The MOD-SLP-REQ message format shown in Table 1 may be used.

Operation (11)

If the activation of the power saving class of a corresponding mobile station (MS) is permitted, the base station (BS) transmits the MOD-SLP-RSP message, in which the initial sleep window, the final sleep window, the listening window, and the start frame number for a sleep window have been defined, to the mobile station (MS). The MOD-SLP-RSP message format shown in Table 2 may be used.

Operation (12)

The mobile station (MS) activates the power saving class from the start frame (frame number=M), by starting sleep window of N1 frames as according to the initial sleep window.

Operation (13)

If the sleep window has expired, the mobile station (MS) receives the MOD-TRF-IND message from the base station (BS) during the listening window. And, the mobile station (MS) identifies the MOD-TRF-IND message indicating whether there is downlink traffic toward the mobile station (MS) or not.

Operation (14)

If there is no downlink traffic toward the mobile station (MS) itself (i.e., if a negative indication is determined), the mobile station (MS) maintains the power saving class operation during a sleep window of 2*N1 frames equal to two times the initial sleep window. The MOD-TRF-IND message format shown in Table 3 may be used.

The sleep window continuously increases by the following equation 1, and the size of the final sleep window can be determined by the following equation 1 on the basis of the final sleep base and the final window exponent determined by the MOD-SLP-RSP message:

$$\text{Final Sleep Window} = \text{Final Sleep Window Base} * 2^{\text{Final Window Exponent}} \quad [\text{Equation 1}]$$

Operation (15)

If the mobile station (MS) recognizes the presence of downlink traffic toward the MS itself upon receiving the MOD-TRF-IND message during the listening window (i.e., if a positive indication is determined), the power saving mode is deactivated.

Figure 2:
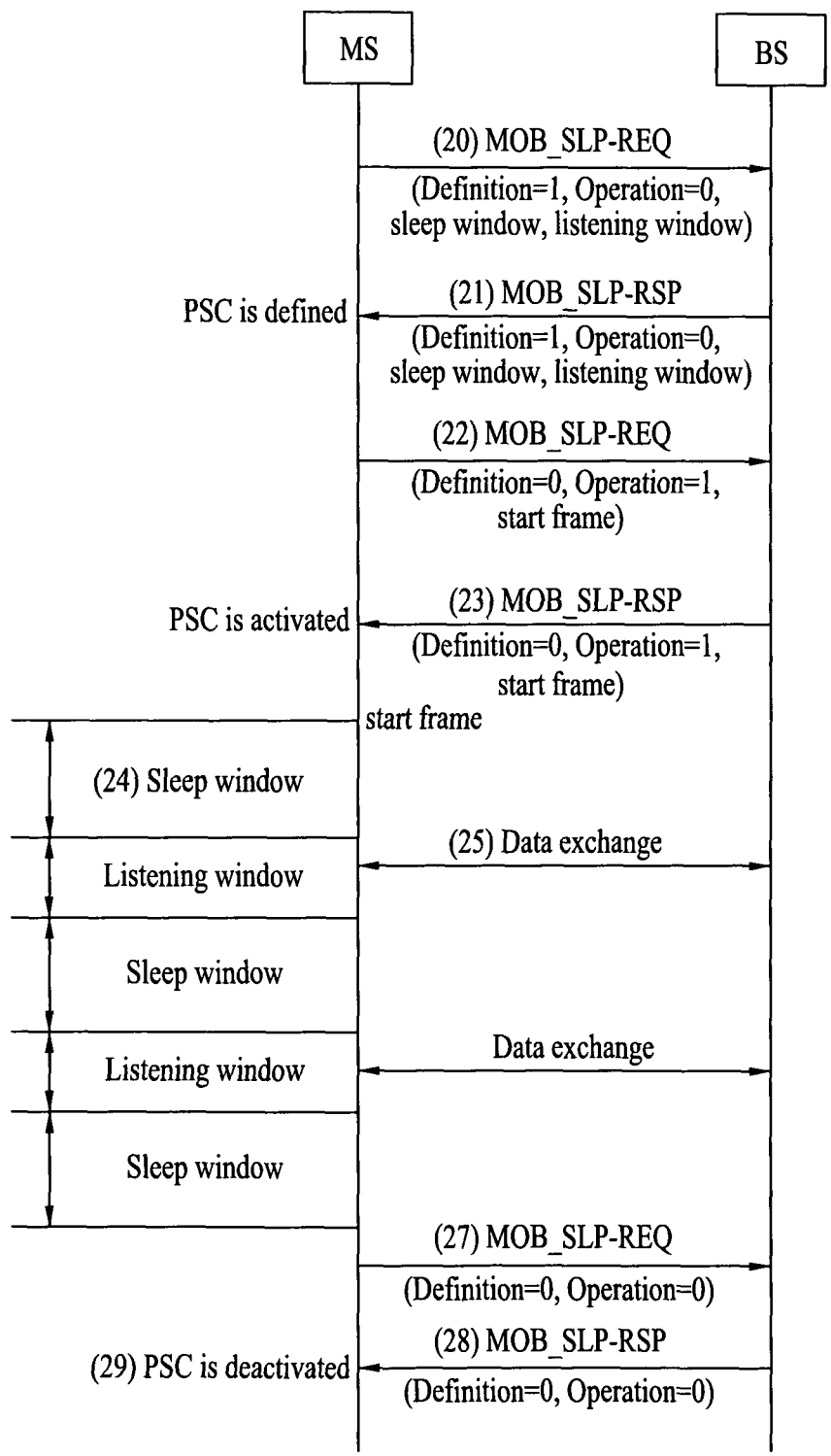
FIG. 2 is a conceptual diagram illustrating operations of a Power Saving Mode Class of type 2 according to the present invention.

FIG. 2 is a conceptual diagram illustrating operations of a Power Saving Mode Class of type 2.

Referring to FIG. 2, a method for operating the mobile station (MS), which employs either an Unsolicited Grant Service (UGS) or a Real Time Variable Service (RT-VR), under the Power Saving-Mode Class of type 2 can be recognized. The UGS service provides a single fixed data rate, and the RT-VR service provides a single real-time variable data rate.

Operation (20)

A mobile station (MS) transmits the MOD-SLP-REQ message of Table 1 to the base station (BS), and requests establishment of power saving class parameters from the base station (BS).

Operation (21)

The base station (BS)-having received the MOD-SLP-REQ message establishes a fixed sleep window and a fixed listening window in the MOD-SLP-RSP message of Table 2, and allows the mobile station (MS) to activate the power saving class.

Operation (22)

The mobile station (MS) transmits the MOD-SLP-REQ message of Table 1 to the base station (BS), and requests activation of the power saving class from the base station (BS).

Operation (23)

The base station (BS) having received the MOD-SLP-REQ message establishes a start frame indicating the power saving mode activating time in the MOD-SLP-RSP message of Table 2, and permits activation of the power saving mode.

Operation (24)

The mobile station (MS) activates the power saving class by starting sleep window according to the established sleep window at the start frame.

Operation (25)

If the sleep window has expired, the mobile station (MS) is synchronized with the base station (BS) to maintain uplink/downlink communication, and can receive downlink data from the base station (BS) during the listening window or transmit uplink data to the base station (BS) during the listening window.

Operation (26)

If the listening window has expired, the mobile station (MS) maintains the power saving mode during the sleep window, thereby preventing power consumption. Thereafter, the mobile station (MS) repeats the operations (24) and (25), so that it is operated under the power saving mode.

Operation (27)

If the mobile station (MS) desires to deactivate the power saving class, it transmits the MOD-SLP-REQ message indicating the deactivation of the power saving mode to the base station (BS).

Operation (28)

If the base station (BS) having received the MOD-SLP-RLP message, it transmits the MOD-SLP-RSP message to the base station (BS), thereby permitting deactivation of the power saving mode.

Operation (29)

If the power saving class has been deactivated, the mobile station (MS) is normally operated.

In this case, in the same manner as in FIG. 1, the MOD-SLP-REG message format of Table 1 may be used, and the MOD-SLP-RSP message format of Table 2 may be used.

Figure 3:
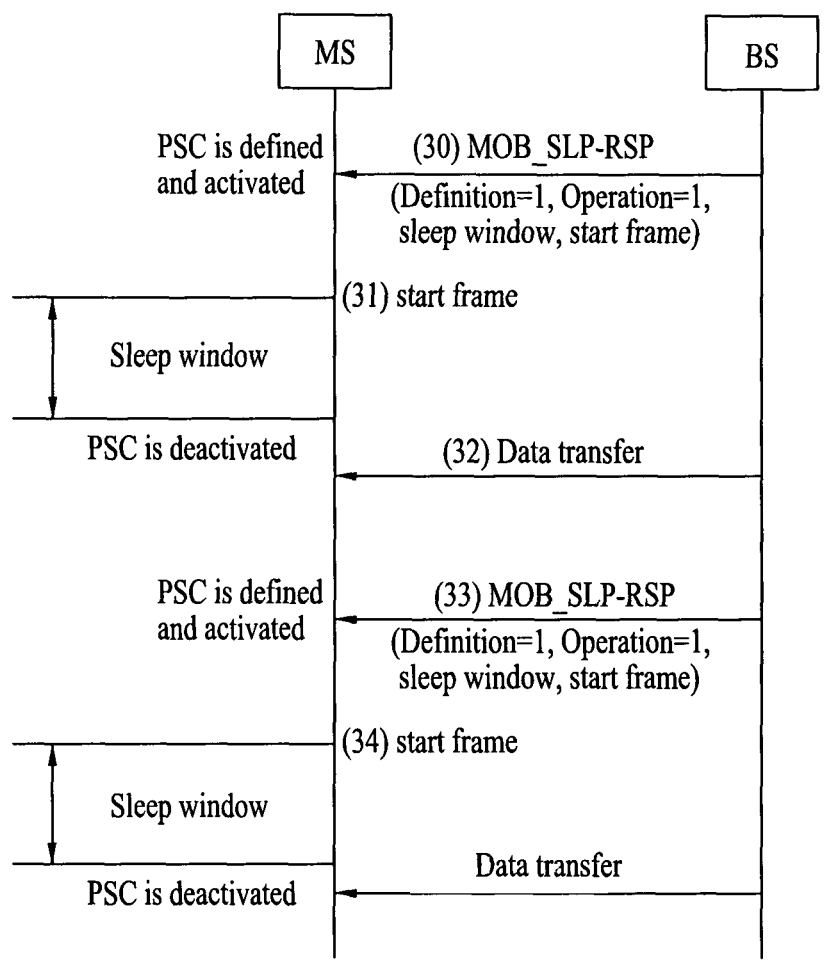
FIG. 3 is a conceptual diagram illustrating operations of a Power Saving Mode Class of type 3 according to the present invention.

FIG. 3 is a conceptual diagram illustrating operations of a Power Saving Mode Class of type 3.

Referring to FIG. 3, a method for operating the mobile station (MS) which receives data from the base station (BS) via a multicast connection under the third power saving class in order to reduce power consumption can be recognized.

Operation (30)

The base station (BS) transmits the MOD-SLP-RSP message to the mobile station (MS), and allows the mobile station (MS) to activate Power Saving Class according to the Power Saving Mode Class of type 3.

Operation (31)

The mobile station (MS) having received the MOD-SLP-RSP message activates the power saving class by starting sleep window at a start frame indicated from the MOD-SLP-RSP message Operation (30).

Operation (32)

If the sleep window has expired, the mobile station (MS) deactivates a communication-enable status with the base station (BS), and receives data from the base station (BS) via the multicast connection.

Operation (33)

If the base station (BS) has completely transmitted all data to the mobile station (MS) under the multicast connection status, it transmits the MOD-SLP-RSP message to the mobile station (MS), so that the mobile station (MS) activates the Power Saving Class to prevent power consumption until transmitting the next multicast data.

Operation (34)

Upon receiving the MOD-SLP-RSP message, the mobile station (MS) activates the power saving class during the sleep window at a start frame indicated from the MOD-SLP-RSP message of the Operation (33).

Operation (35)

The above-mentioned operations (32), (33), and (34) are repeated.

As described above, the broadband wireless access system can support different power saving classes at individual connections of service types in order to reduce the power consumption of the mobile station (MS).

Figure 4:
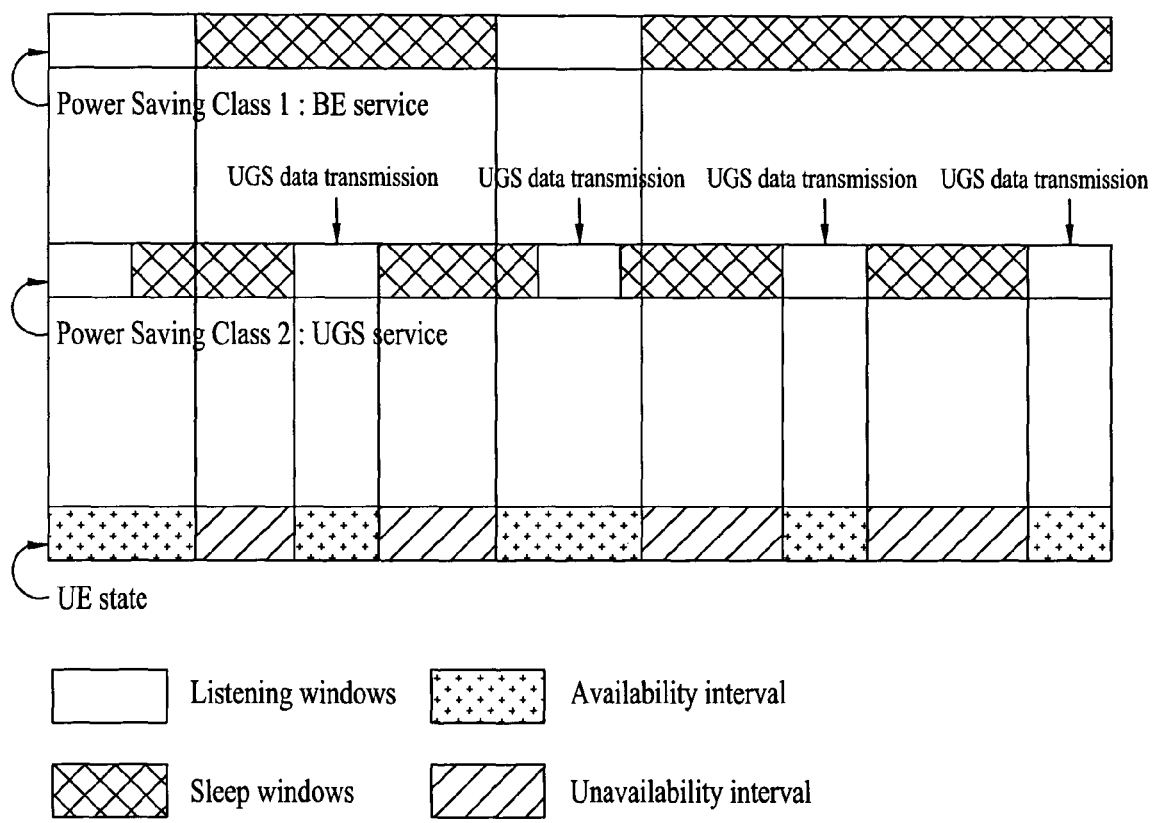
FIG. 4 is a conceptual diagram illustrating operation states of a mobile station (MS) according to the present invention.

FIG. 4 is a conceptual diagram illustrating operation states of a mobile station (MS).

In more detail, FIG. 4 shows operations of the power saving mode of a specific mobile station (MS) in which several power saving classes are activated.

Referring to FIG. 4, a first line indicates a sleep window and a listening window of the Power Saving Mode Class of type 1. A second line indicates a sleep window and a listening window of the Power Saving Mode Class of type 2. A third line indicates operation states of the specific mobile station (MS).

In other words, the mobile station (MS) in which several power saving classes are activated temporarily disables uplink/downlink communication associated with the base station (BS), so that it can prevent power from being consumed during an overlapped window of the sleep windows for each class. The above-mentioned operation window of the mobile station (MS) is called an unavailability window.

The power saving mode can be performed by the following two steps, i.e., a power saving class definition step and a power saving operation step.

Power Saving Class Definition

A variety of power saving parameters, for example, a sleep window, a listening window, a sleep ID, and a connection ID are defined, unique power saving class identifiers (IDs) are allocated to the defined power saving classes. Although the same power saving class is used, different power saving parameters are used in the same power saving class, another power saving class ID is allocated to the above-mentioned power saving class.

Power Saving Class Operation

Operations of the defined power saving class are activated or operations of the activated power saving class are deactivated.

Figure 5:
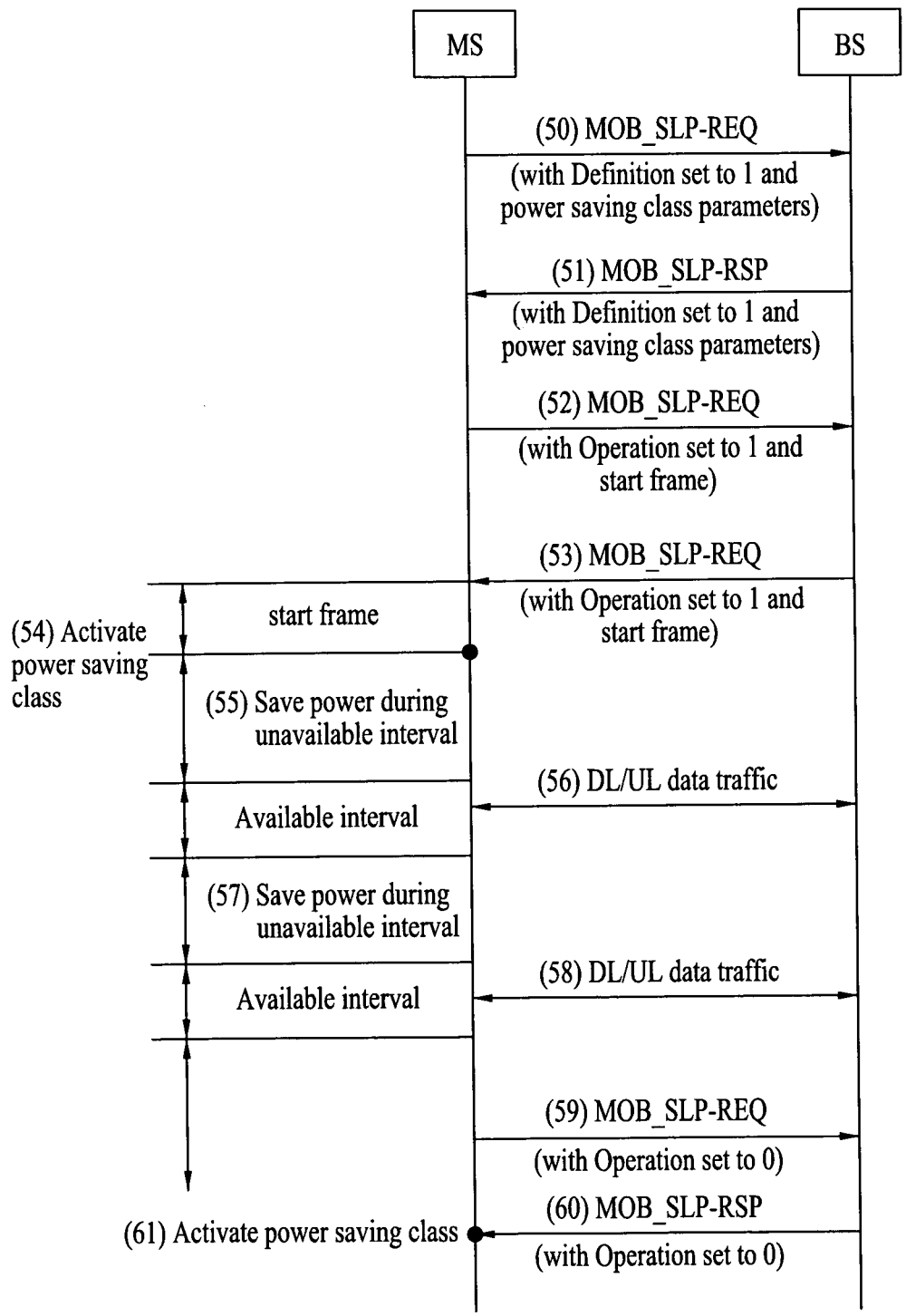
FIG. 5 is a conceptual diagram illustrating operations of a mobile station (MS) of a power saving mode according to the present invention.

FIG. 5 is a conceptual diagram illustrating operations of the power saving mode MS in case that several Power Saving Classes are activated simultaneously.

Operations (50)~(60) of the power saving mode will hereinafter be described in detail.

Operation (50)

In order to define the power saving class, a normal-state mobile station (MS) transmits the MOD-SLP-REQ message, including a variety of parameters (e.g., a power saving class type, a connection direction, an initial sleep window, a listening window, a final sleep window, a final sleep window exponent, a traffic indicator flag, and a connection ID), to the service base station (BS). In this case, a definition field is set to "1", so that the definition field of "1" indicates the MOD-SLP-REQ message for defining the power saving class.

Operation (51)

The base station (BS) having received the MOD-SLP-REQ message transmits the MOD-SLP-RSP message, including a variety of power saving parameters (e.g., a power saving class type, a connection direction, an initial sleep window, a listening window, a final sleep window, a final sleep window exponent, a traffic indicator flag, a sleep ID, and a connection ID), to the mobile station (MS).

Operation (52)

In order to request the activation of the power saving class from the base station (BS), the mobile station (MS) transmits the MOD-SLP-REQ message in which a operation field is set to "1" to the base station (BS). In this case, the mobile station (MS) includes a start time of the power saving mode in the MOD-SLP-REQ message, and then transmits the resultant MOD-SLP-REQ message.

Operation (53)

The service base station (BS) having received the MOD-SLP-REQ message in which the operation field is set to "1" transmits the MOD-SLP-RSP message, in which the operation field is set to "1" and a start time of the activation of the power saving class is defined, to the mobile station (MS).

Operation (54)

The mobile station (MS) having received the MOD-SLP-RSP message is shifted to the power saving mode when a current time reaches the start time.

Operation (55)

In order to minimize an amount of power consumption during the sleep window serving as a communication-disable window, the mobile station (MS) does not receive downlink signals from the service base station (BS), and does not transmit uplink traffic to the service base station (BS).

Operation (56)

During the listening window serving as a communication-enable window, the mobile station (MS) may receive downlink data from the base station (BS) or transmit uplink data to the base station (BS).

Operation (57)

If the listening window is terminated, the mobile station (MS) maintains the power saving class during the sleep window, thereby preventing power consumption.

Operation (58)

The mobile station (MS) transmits or receives uplink/downlink data to/from the service base station (BS) during the listening window.

Operation (59)

If the mobile station (MS) enters the power saving class during the listening window, it transmits either the MOD-SLP-REQ message in which an operation field for commanding the power saving mode to be deactivated is set to "0", or a sleep control header to the base station (BS).

Operation (60)

If the service base station (BS) has received the deactivation request of the power saving class via the MOD-SLP-REQ message or the sleep control header, it transmits the MOD-SLP-RSP message, which includes a specific operation field of "0" indicating deactivation of the power saving mode, to the mobile station (MS).

Operation (61)

Upon receiving the MOD-SLP-RSP message in which the operation field is set to "0", the mobile station (MS) deactivates a corresponding power saving class, and terminates the power saving mode. If several power saving classes are activated, only the operation of the corresponding power saving class can be deactivated.

As described above, although the definition and the operation of the power saving class have been disclosed in different ways, the MOD-SLP-REQ and MOD-SLP-RSP messages, each of which includes the definition field of "1" and the operation field of "1", are communicated between the mobile station (MS) and the base station (BS), so that the power saving class may be defined and at the same time the activation of a corresponding power saving class may be performed.

In a wireless communication system employing the power saving mode for each power saving class, if transmission of data other than traffic of a reference service of each class selection is needed, a method for operating the power saving mode will hereinafter be described. As an example of the above-mentioned data (or traffic) other than service traffic used as a reference of each class selection, an exemplary case for transmitting the MAC control message will hereinafter be described.

However, the above-mentioned case is not limited to the MAC control message, and it is obvious to those skilled in the art that the above-mentioned case can also be applied to other transmission cases of data (e.g., short packet data) having characteristics similar to those of the aforementioned data other than the reference traffic of each class selection. The MAC control message may also be called the MAC management message.

The MAC control message communicated between the mobile station (MS) and the base station (BS) may irregularly occur in a similar way to the non-real-time service traffic. The message size is different in function, so that the requested data transfer rate is also irregular.

Therefore, a control connection (e.g., a basic management connection for transmitting the MAC control message or a primary-associated connection) is coupled to the power saving class (e.g., the Power Saving Mode Class of type 1) composed of both a constant listening window and an exponentially-increasing sleep window, so that the mobile station (MS) can be operated under the power saving mode.

However, the MAC control message is exchanged only once between the mobile station (MS) and the base station (BS) according to the 1-way, 2-way, or 3-way handshake method. The MAC control message is controlled at a MAC terminal of each of the mobile station (MS) and the base station (BS), so that it can be easily predicted, differently from other non-real-time service traffics.

Exemplary methods for controlling the power saving mode or sleep mode in consideration of the above-mentioned characteristics of the MAC control message will hereinafter be described in detail.

saving class is re-activated. In this case, the signaling may be defined in the MAC layer capable of commanding the power saving class to be temporarily deactivated or re-activated.

In a third method, the power saving class is pended during a predetermined time to transmit the MAC control message without termination of the sleep mode. If the predetermined time has expired, the power saving class is automatically re-activated.

In the case of the second method from among the above-mentioned methods, an additional message is communicated between the mobile station (MS) and the base station (BS), so that the power saving mode can be controlled. For the convenience of description and better understanding of the present invention, a first message for temporarily deactivating the power saving class is called a sleep-mode pending (SLP_PEND) message. A second message for re-activating the corresponding power saving class after the MAC control message has been completely transmitted is called a sleep-mode resume (SLP_RSM) message.

The following table 6 shows exemplary SLP_PEND messages.

TABLE 6

| Syntax | Size | Notes |
|---|---|---|
| SLP-PEND_Message_format( ){ | | |
| Management message type = xx | 8 bits | |
| PSC ID | 6 bits | Power Saving Class Identifier |
| Pending Code | 2 bits | 0b00: SLP-RSM message (Deactivate PSC until SLP-RSM message is received) 0b01: (Deactivate PSC during the number of sleep windows) 0b10: (Deactivate PSC until the frame indicated in this message) 0b11: reserved |
| If(Code==0b01){ | | |
| Num_sleep_window | 8 bits | Number of sleep windows in which the PSC is deactivated |
| Reactivation Code | 2 bits | 0b00: (Maintain the previous PSC parameters) 0b01: (Reset the PSC parameters) 0b10: (Redefine the PSC parameters) 0b11: reserved |
| } | | |
| If(Code==0b10){ | | |
| Frame number | 8 bits | (LSB of the frame in which the PSC is reactivated) |
| Reactivation Code | 2 bits | 0b00: (Maintain the previous PSC parameters) 0b01: (Reset the PSC parameters) 0b10: (Redefine the PSC parameters) 0b11: reserved |
| } | | |
| TLV tuple | Variable | Message Authentication Code(e.g. CMAC, OMAC, HMAC), If Reactivation Code = 0b10, PSC parameter (sleep window, listening window) can be included |
| } | | |

In a first method, the power saving class has been defined by the above-mentioned method, and the MAC control message can be transmitted during a listening window or sleep window under the sleep mode. In other words, the first method allows the MAC control message to be communicated between the mobile station (MS) and the base station (BS), without exchanging additional messages or information to transmit the MAC control message.

In a second method, if the MAC control message transmission is needed during the sleep mode, the power saving class coupled to the MAC management connection is temporarily deactivated under the sleep mode. Then, if the MAC control message transmission is completed, the corresponding power As can be seen from Table 6, the SLP_PEND message may include a pending code field to determine whether the power saving class will be pended or how long the power saving class will be pended. If the pending code field value of the SLP_PEND message indicates how long the power saving class will be pended, the SLP_PEND message may further include a NUM_Sleep_Window field and a Frame Number field to transmit information of pending time of the power saving class.

And, the SLP_PEND message may further include a Reactivation Code field to transmit information of the reactivation status. According to the information of the Reactivation Code field, the SLP_PEND message may maintain a previous status of the power saving class so that it may reactivate the power saving class. According to the information of the Reactivation Code field, the SLP_PEND message may reset or redefine the power saving class parameters, so that the power saving class may be reactivated.

Examples of The SLP_RSM message are shown in the following Table 7:

TABLE 7

| Syntax | Size | Notes |
|---|---|---|
| SLP-RSM_Message_format( ){ | | |
| Management message type = xx | 8 bits | |
| PSC ID | 6 bits | Power Saving Class Identifier |
| Code | 2 bits | 0b00: (Maintain the previous PSC parameters) |
| | | 0b01: (Reset the PSC parameters) |
| | | 0b10: (Redefine the PSC parameters) |
| | | 0b11: reserved |
| Start Frame | 8 bits | (LSB of the frame in which the PSC is reactivated) |
| TLV tuple | Variable | Message Authentication Code (e.g. CMAC, OMAC, HMAC), If Code = 0b10, PSC parameters (sleep window, listening window) can be included |
| } | | |

As can be seen from Table 7, the SLP_RSM message may include a PSC ID field to discriminate a corresponding power saving class. If the corresponding power saving class is reactivated as shown in Table 6, the SLP_RSM message may further include the Reactivation Code field to transmit information of the reactivation status. If the power saving class is pended by the SLP_PEND message, the power saving class can be reactivated by the SLP_RSM message, and the SLP_RSM message may further include a Start Frame field to indicate a start time of the reactivation.

The mobile station (MS) or the base station (BS) having received the messages of Tables 6 and 7 transmits an Acknowledgement message shown in Table 8, so that they can determine whether the messages have been received.

Examples of the SLP_ACK message are shown in the following Table 8:

As can be seen from Table 8, the SLP_ACK message may include the PSC ID field to discriminate a corresponding power saving class in the same manner as in Table 7. In order to indicate the acknowledgement or non-acknowledgement status, the SLP_ACK message may further include a Code field. In other words, the SLP_ACK message may indicate whether SLP_PEND message or the SLP_RSM message has been normally received by referring to the above-mentioned Code field.

In order to control the sleep mode, the above-mentioned additional messages may be defined. The present invention may include conventional messages, include necessary information in a header part added to the conventional messages, and control the sleep mode or the power saving mode using the necessary information. For example, the present invention may use a downlink control sub-header or an uplink control header.

Examples of the downlink sub-header for controlling the sleep mode are shown in the following Table 9:

TABLE 8

| Syntax | Size | Notes |
|---|---|---|
| SLP-ACK_Message_format( ){ | | |
| Management message type = xx | 8 bits | |
| Type | 8 bits | Received message type |
| PSC ID | 6 bits | Power Saving Class Identifier |
| Code | 2 bits | 0b00: OK |
| | | 0b01: Not OK |
| | | 0b10-0b11: reserved |
| TLV tuple | Variable | Message Authentication Code (e.g. CMAC, OMAC, HMAC), If the SLP_ACK message is used to confirm SLP-PEND and SLP-RSM. The SLP_ACK message may include Start Frame equal to PSC reactivate time as TLV parameter |
| } | | |

TABLE 9

| Name | Size | Description |
|---|---|---|
| Power_Saving_Class_ID | 6 bits | Indicates the Power Saving Class ID to whitch this command refers |
| Operation | 2 bits | 0b00 = (de-activate Power Saving Class) |
| | | 0b01 = (activate Power Saving Class) |

TABLE 9-continued

| Name | Size | Description |
| --- | --- | --- |
| Start Frame | 6 bits | 0b10 = (end Power Saving Class)<br>0b11 = (resume Power Saving Class)<br>(LSB of the frame in which the PSC is activated. If the operation bit is set to 0b00, this bit shall be ignored.) |
| Code | 2 bits | (This bit indicates whether PSC parameters are maintained, reset or redefined. If Operation bit is set to 0b10 or 0b11, this bit is meaningful. Otherwise, this bit should be ignored.)<br>0b00: (Maintain the previous PSC parameters)<br>0b01: (Reset the PSC parameters)<br>0b10: (Redefine the PSC parameters)<br>0b11: reserved |

As can be seen from Table 9, a Power_Saving_Class_ID field, an Operation field, a Start Frame field, and a Code field may be contained in a predetermined downlink sub-header. Information transmitted via individual fields can be recognized by Table 6 or 9.

Examples of the uplink header for controlling the sleep mode are shown in Table 10:

TABLE 10

| Name | Length(bits) | Description |
| --- | --- | --- |
| Type | 3 | The type of Bandwidth request and uplink sleep control header is defined in Table 5a. |
| BR | 11 | Bandwidth request: The number of bytes of uplink bandwidth requested by the MS. The bandwidth request is for the CID. The request shall not include any PHY overhead. It is incremental BW request. |
| Power_Saving_Class_ID | 6 | Power Saving Class ID. |
| Operation | 2 | 0b00 = (de-activate Power Saving Class)<br>0b01 = (activate Power Saving Class)<br>0b10 = (pend Power Saving Class)<br>0b11 = (resume Power Saving Class) |
| CID | 16 | Basic CID of the MS for which the bandwidth request and uplink sleep control header is sent. |
| HCS | 8 | Header Check Sequence (same usage as HCS entry in Table 5). |

As can be seen from Table 10, the uplink header may include a Power_Saving_Class_ID field and an Operation field.

As can be seen from Tables 9 and 10, the present invention does not transmit additional messages for controlling the sleep mode, may include corresponding information in a predetermined message header, and transmit the resultant header. In this case, the number of messages transmitted from the mobile station (MS) to the base station may be reduced.

As can be seen from Tables 6 and 7, if the additional messages are configured to control the power saving mode, much more information than the amount of information capable of being contained in the header part can be exchanged, so that the present invention can easily control the power saving mode.

A method for controlling the power saving mode using the above-mentioned messages will hereinafter be described with reference to the appended drawings. The following embodiments will disclose the application case of the Power Saving Mode Class of type 1. However, technical concepts of the present invention may be equally or similarly applied to all kinds of power saving classes.

Figure 6:
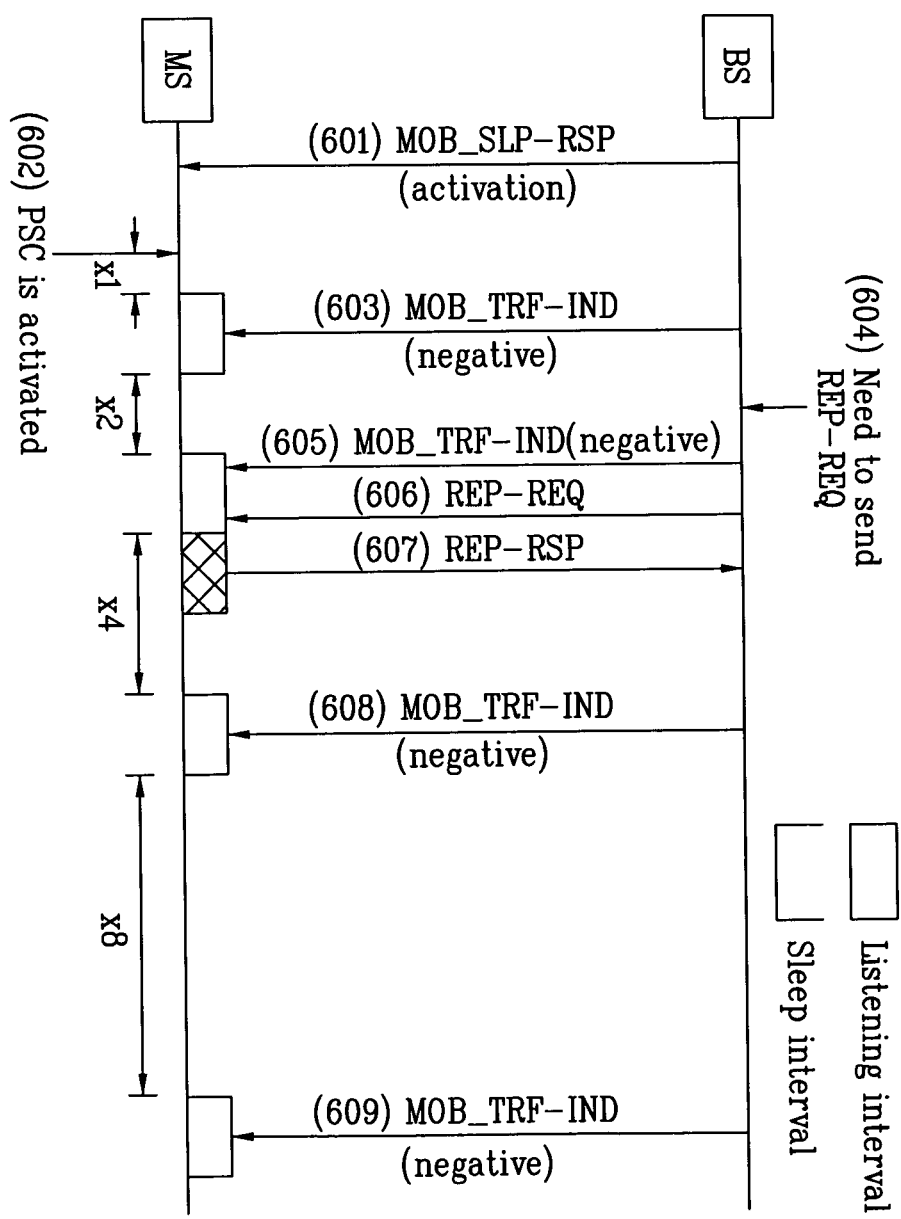
FIG. 6 is a conceptual diagram illustrating one embodiment of the present invention.

FIG. 6 is a conceptual diagram illustrating one embodiment of the present invention.

Referring to FIG. 6, a method for transmitting/receiving the MAC control message without deactivating the power saving, class using the mobile station (MS) currently operated under the power saving mode during the downlink transmission can be recognized.

Operation (601)

The base station (BS) transmits the MOD-SLP-RSP message to the mobile station (MS), and activates the power saving class, so that the mobile station (MS) is shifted to the power saving mode. The MS shifting to the power saving mode by the MOD-SLP-RSP message may be transmitted as a response after the base station (BS) receives the MOD-SLP-REQ message from the mobile station (MS), and may be performed by the base station (BS) without receiving the MOD-SLP-REQ message of the mobile station (MS).

Operation (602)

The mobile station (MS) operates the sleep window (x1) equal to the initial sleep window if a current time reaches a start time of the activation of the power saving class.

Operation (603)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode by operating the sleep window (x2) equal to two times the initial sleep window.

Operation (604)

The base station (BS) determines whether the downlink MAC control message is needed to be transmitted to the mobile station (MS) of the power saving mode.

Operation (605)

The base station (BS) transmits the MOD-TRF-IND message indicating the presence or absence of downlink user data to the mobile station (MS) during the listening window.

Operation (606)

The base station (BS) transmits a downlink MAC control message (e.g., channel quality report request (REP_REQ) message) during the listening window.

Operation (607)

If the mobile station (MS) having received the downlink MAC control message from the base station (BS) must transmit the uplink MAC control message, it transmits the MAC control message (e.g., the REP_RSP message) to the base station (BS), irrespective of the listening or sleep window. In this case, the activated power saving class is maintained. The mobile station (MS) having transmitted the uplink MAC control message performs power saving operations, for example, it does not receive the downlink frame during the remaining sleep window.

The oblique-lined part of FIG. 6 at operation (607) is included in the sleep window determined by the activated power saving class. Basically, the oblique-lined part may not be used by a corresponding mobile station (MS) and a corresponding base station (BS). However, in this embodiment, the oblique-lined part of FIG. 6 may indicate a specific interval in which data or messages can be transmitted or received.

Although the message has been transmitted to the unavailable interval (e.g., the sleep window) of the system, a predetermined fact may be previously notified to normally transmit/receive the above-mentioned message, without ignoring or deleting the above-mentioned message by the base station (BS) or the mobile station (MS). In other words, although the power saving class is activated, if the fact that the message can be transmitted or received during the sleep window caused by the power saving mode is previously notified, the message is basically transmitted or received without any errors during the unavailable window.

Operation (608)

If the sleep window (x4) has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving class during the next sleep window (x8).

Operation (609)

If the sleep window (x8) has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving class during the next sleep window.

As can be seen from FIG. 6, the base station (BS) transmits the MAC control message to the mobile station (MS) during the listening window, so that the downlink MAC control message can be transmitted to the mobile station (MS) operated under the power saving mode. The mobile station (MS) may not terminate the power saving mode to receive the MAC control message.

Also, if the mobile station (MS) needs to transmit the uplink MAC control message, it transmits the MAC control message to the base station (BS) irrespective of the listening or sleep window. The base station (BS) maintains the power saving mode and decodes the message although it has received the MAC control message during the sleep window.

When the MOD-SLP-REQ and MOD-SLP-RSP messages for defining the sleep-mode parameters of FIG. 6 are exchanged between the mobile station (MS) and the base station (BS), the present invention may define the sleep control message, so that it can allow the mobile station (MS) and the base station (BS) to transmit/receive the MAC control message without deactivation of the power saving class.

Figure 7:
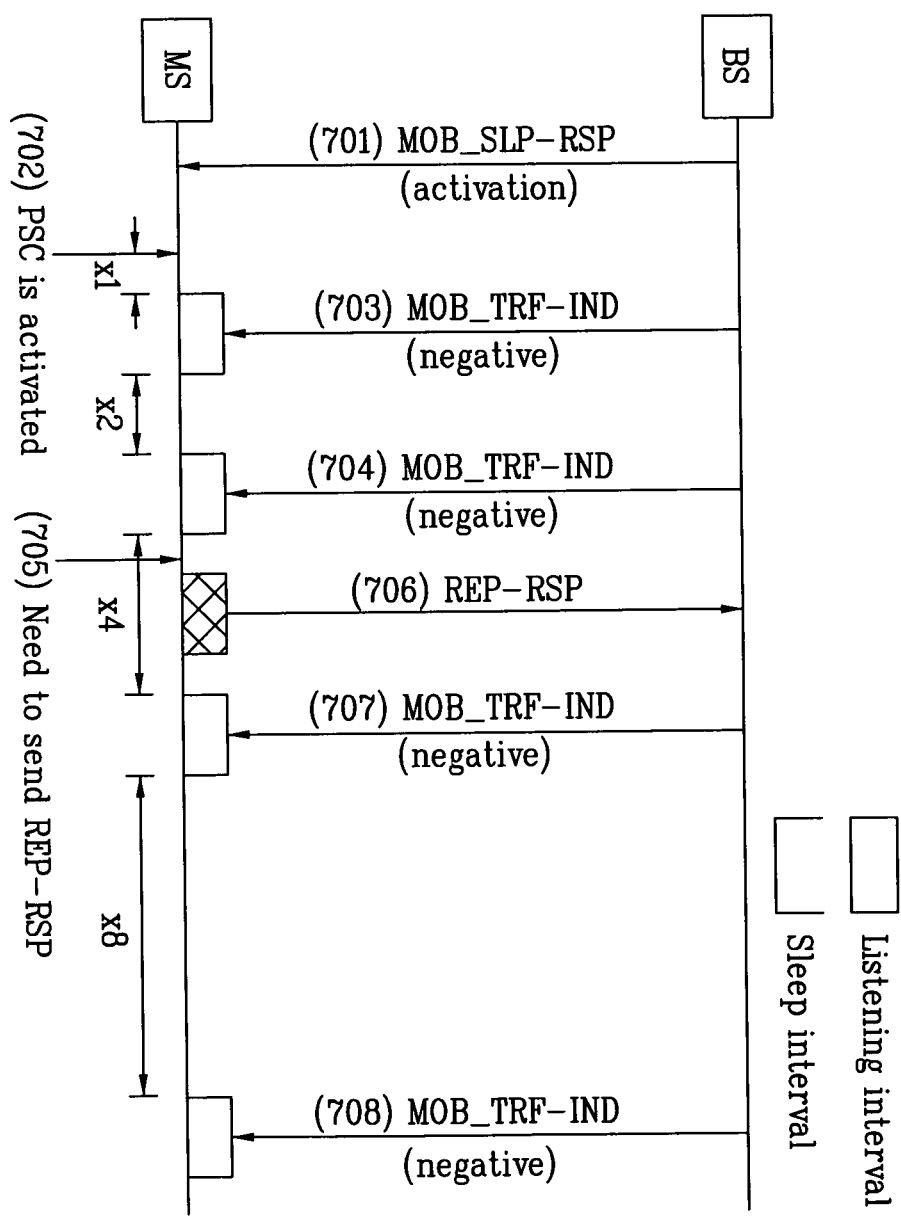
FIG. 7 is a conceptual diagram illustrating one embodiment of the present invention.

FIG. 7 is a conceptual diagram illustrating one embodiment of the present invention.

Referring to FIG. 7, a method for transmitting/receiving the MAC control message by the mobile station (MS) currently operated under the power saving mode, without deactivating the power saving class, can be recognized.

Operation (701)

The base station (BS) transmits the MOD-SLP-RSP message to the mobile station (MS), activates the power saving class, and commands the mobile station (MS) to be shifted to the power saving mode. The MS shifting to the power saving mode by the MOD-SLP-RSP message may be transmitted as a response after the base station (BS) receives the MOD-SLP-REQ message from the mobile station (MS), and may be performed by the base station (BS) without receiving the request message of the mobile station (MS).

Operation (702)

The mobile station (MS) operates the sleep window (x1) equal to the initial sleep window if a current time reaches a start time of the activation of the power saving class.

Operation (703)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) operates the power saving mode during the sleep window (x2) equal to two times the initial sleep window.

Operation (704)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode by operating the sleep window (x4) equal to two times the previous initial sleep window.

Operation (705)

The mobile station (MS) determines whether the uplink MAC control message is needed to be transmitted to the base station (BS), while it is operated under the power saving mode.

Operation (706)

The mobile station (MS) maintains the power saving mode (i.e., the mobile station (MS) maintains a repetition algorithm of the sleep and listening windows). If there is a need for the uplink MAC control message is transmitted to the base station (BS), the mobile station (MS) transmits the uplink MAC control message (e.g., REP_RSP message) to the base station (BS) irrespective of the sleep window (x4).

Although the base station (BS) receives the uplink MAC control message from the Mobile station (MS) of the power saving mode during the sleep window, it does not deactivate the power saving class of the corresponding mobile station (MS). Also, after the mobile station (MS) transmits the uplink MAC control message, it performs power saving operations, (for example, it does not receive a downlink frame during the remaining sleep window).

The oblique-lined part of FIG. 7 at operation (706) is included in the sleep window determined by the activated power saving class. Basically, the oblique-lined part may not be used by a corresponding mobile station (MS) and a corresponding base station (BS). However, in this embodiment, the oblique-lined part of FIG. 7 may indicate a specific interval in which data or messages can be transmitted or received.

Also, if the above-mentioned fact that the message can be transmitted or received during the unavailable interval is previously notified to the base station (BS) and the mobile station (MS), the message can be transmitted or received without any errors during the unavailable interval.

Operation (707)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode by operating the sleep window (x8) equal to the next sleep window.

Operation (708)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode by operating the sleep window (x16) equal to the next sleep window.

Figure 8:
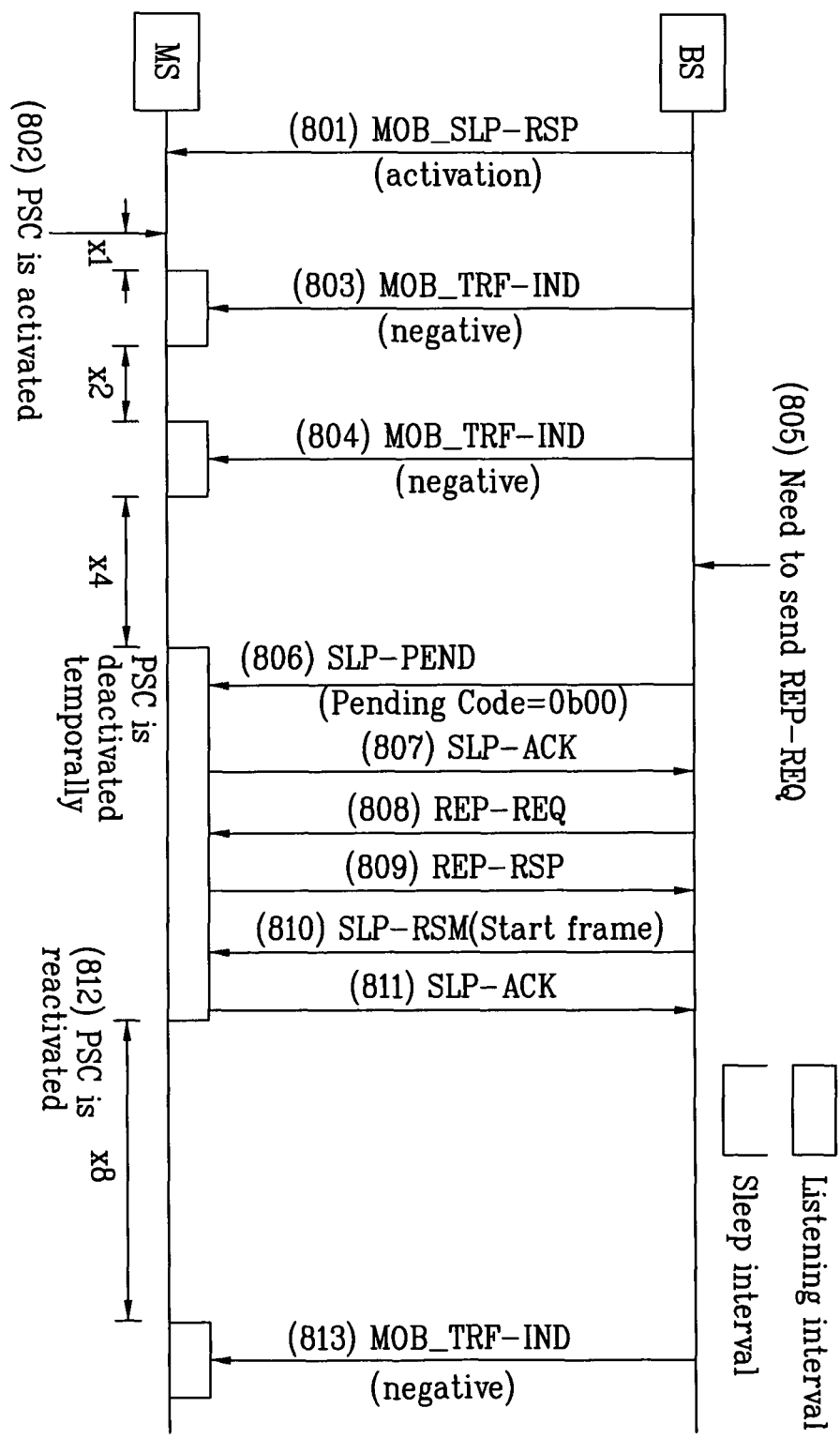
FIG. 8 is a conceptual diagram illustrating another embodiment of the present invention.

FIG. 8 is a conceptual diagram illustrating another embodiment of the present invention.

Referring to FIG. 8, the mobile station (MS) currently operated under the power saving mode during the downlink transmission temporarily deactivates the power saving class, and may transmit/receive the MAC control message.

Operation (801)

The base station (BS) transmits the MOD-SLP-RSP message to the mobile station (MS), activates the power saving class, and commands the mobile station (MS) to be shifted to the power saving mode. The MS shifting to the power saving mode by the MOD-SLP-RSP message may be transmitted as a response after the base station (BS) receives the MOD-SLP-REQ message from the mobile station (MS), and may be performed by the base station (BS) without receiving the request message of the mobile station (MS).

Operation (802)

The mobile station (MS) operates the sleep window (x1) equal to the initial sleep window if a current time reaches a start time of the activation of the power saving class.

Operation (803)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode by operating the sleep window (x2) equal to two times the initial sleep window.

Operation (804)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode by operating the sleep window (x4) equal to two times the previous initial sleep window.

Operation (805)

The base station (BS) determines whether the downlink MAC control message is needed to be transmitted to the mobile station (MS) operated under the power saving mode.

Operation (806)

If there is a need for the uplink MAC control message is transmitted to the mobile station (MS), the base station (BS) transmits the SLP-PEND message to the mobile station (MS) during the listening window. In this case, the SLP-PEND message may use the message format shown in Table 6. According to the pending code setup value of the SLP-PEND message, the base station (BS) may temporarily deactivate the power saving class until receiving the SLP-RSM message, or may temporarily deactivate the power saving class for a predetermined period of time.

This embodiment relates to a method for temporarily pending the power saving class until the base station (BS) receives the SLP-RSM message. In other words, "0b00" is contained in the pending code field of Table 6, as denoted by "pending code=0b00". This code "0b00" commands the base station (BS) to temporarily deactivate the power saving class until receiving the SLP-RSM message.

Operation (807)

The mobile station (MS) transmits the SLP_ACK message to the base station (BS) after receiving the SLP-PEND message from the base station (BS), so that it may inform the base station (BS) of temporary pending of the power saving class. The SLP_ACK message may use the message format using Table 8, or may use messages for transmitting ACK/NACK messages.

By transmission/reception of the SLP-PEND message or the SLP_ACK message, the power saving class of the mobile station (MS) is temporarily deactivated. In other words, if the above-mentioned process is not found, the power saving mode is maintained during the sleep window equal to two times the previous sleep window, after the listening window has elapsed. However, if the SLP-PEND message commands the power saving class to be activated, the power saving mode is not maintained during a prescribed sleep window, and the prescribed sleep window may be used as an available interval for exchanging messages.

Operation (808)

By transmission/reception of the SLP-PEND and the SLP_ACK messages, the power saving class of the mobile station (MS) is temporarily deactivated, and the base station (BS) transmits the downlink MAC control message (i.e., the REP_REQ message).

Operation (809)

If the mobile station (MS) having received the downlink MAC control message from the base station (BS) must transmit the uplink MAC control message, it transmits the MAC control message (e.g., REP_RSP message).

Operation (810)

If the base station (BS) desires to reactivate the power saving class, the SLP-RSM message proposed by Table 7 can be transmitted. In other words, if the base station (BS) transmits all the downlink MAC control messages or receives the uplink MAC control message to be received from the mobile station (MS), the base station (BS) transmits the SLP-RSM message to the mobile station (MS), so that the power saving class of the mobile station (MS) can be reactivated.

As described above, the SLP-RSM message may include the sleep-window size required for reactivation. In other words, in the case of reactivation, the SLP-RSM message may include setup information of the power-saving-mode operation status.

For example, if the power saving class of the mobile station (MS) is reactivated by the SLP-RSM message, the base station (BS) may allow the initial sleep window to maintain a previous sleep window increasing algorithm. In this case, if the SLP-RSM message of Table 7 is used, the Reactivation Code field is set to "0b00", and be then transmitted.

And, if the sleep window is initialized and the power saving class is reactivated, a first sleep window may be set to the initial sleep window. In this case, the Reactivation Code field may be set to "0b01", and be then transmitted.

Also, the sleep window and the listening window are newly defined, so that the defined windows may be used. In this case, the Reactivation Code field value may be set to "0b10", and be then transmitted.

Also, the SLP-RSM message may further include time information indicating when the power saving class will be reactivated. The time information may indicate a specific time at which the reactivation will be executed, or may be used as frame information (e.g., start frame field information).

Operation (811)

If the mobile station (MS) receives the SLP-RSM message from the base station (BS), it transmits the SLP_ACK message to the base station (BS). In this case, the mobile station (MS) may use not only the SLP_ACL message but also the ACK/NACK message.

Operation (812)

If a current time reaches a reactivation time of the power saving class according to information contained in the SLP-RSM message, it maintains the power saving mode during the sleep window corresponding to the size of a corresponding sleep window on the basis of resume status information recognized by the SLP-RSM message. For example, if the power saving class of the mobile station (MS) is reactivated, and specific information which commands the initial sleep window to maintain a previous sleep window increasing algorithm is transmitted, the power saving mode is maintained during the sleep window (x8) corresponding to the corresponding sleep window size.

Operation (813)

If the sleep window has expired, the mobile station (MS) transmits the MOD-TRF-IND message from the base station (BS) during the listening window. If there is no downlink traffic toward the mobile station (MS) (i.e., if a negative indication is determined), the mobile station (MS) maintains the power saving mode during the sleep window (x16) equal to next sleep window size.

Figure 9:
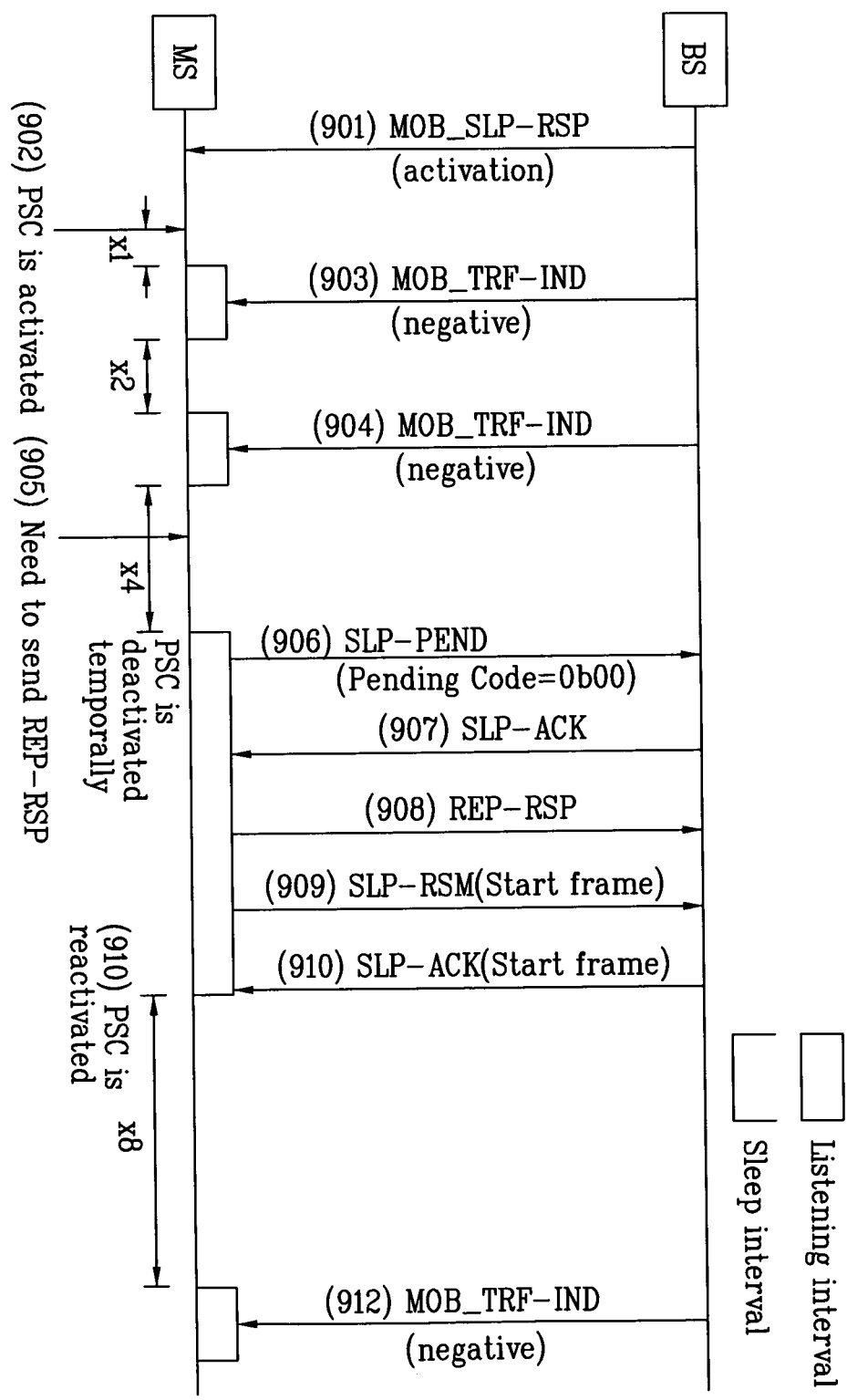
FIG. 9 is a conceptual diagram illustrating another embodiment of the present invention.

FIG. 9 is a conceptual diagram illustrating another embodiment of the present invention.

Referring to FIG. 9, the mobile station (MS) currently operated under the power saving mode during the uplink transmission temporarily deactivates the power saving class, and may transmit/receive the MAC control message.

Operation (901)

The base station (BS) transmits the MOD-SLP-RSP message to the mobile station (MS), activates the power saving class, and commands the mobile station (MS) to be shifted to the power saving mode. The MS shifting to the power saving mode by the MOD-SLP-RSP message may be transmitted as a response after the base station (BS) receives the MOD-SLP-REQ message from the mobile station (MS), and may be performed by the base station (BS) without receiving the request message of the mobile station (MS).

Operation (902)

The mobile station (MS) operates the sleep window (x1) equal to the initial sleep window if a current time reaches a start time of the activation of the power saving class.

Operation (903)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode during the sleep window (x2) equal to two times the initial sleep window.

Operation (904)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode during the sleep window (x4) equal to two times the previous initial sleep window.

Operation (905)

The mobile station (MS) operated under the power saving mode determines whether transmission of the uplink MAC control message is needed.

Operation (906)

If there is a need for the uplink MAC control message is transmitted to the base station (BS), the mobile station (MS) transmits the SLP-PEND message to the mobile station (MS), and requests the base station (BS) to temporarily deactivate the power saving class. In this case, the SLP-PEND message may use the message format shown in Table 6. According to the pending code setup value of the SLP-PEND message, the mobile station (MS) may temporarily deactivate the power saving class until it transmits the SLP-RSM message, or may temporarily deactivate the power saving class for a predetermined period of time.

This embodiment relates to a method for temporarily pending of the power saving class until the mobile station (MS) transmits the SLP-RSM message, as denoted by "pending code=0b00".

Operation (907)

If the base station (BS) receives the SLP-PEND message from the mobile station (MS), it transmits the SLP_ACK message of Table 8 to the mobile station (MS), so that it may inform the mobile station (MS) of temporary deactivation of the power saving class that is, pending of the power saving class.

Operation (908)

The mobile station (MS) transmits the uplink MAC control message (e.g., REP-RSP message) to be transmitted.

Operation (909)

If the mobile station (MS) desires to reactivate the power saving class, the SLP-RSM message can be transmitted. In other words, if the mobile station (MS) transmits all the uplink MAC control messages or receives the downlink MAC control message to be received from the base station (BS), the mobile station (MS) transmits the SLP-RSM message to the base station (BS). In this case, the above-mentioned SLP-RSM message of Table 7 may be used.

In this case, the mobile station (MS) may include setup information of power saving mode operation status in a specific field of the SLP-RSM message. In this case the setup information of the power saving mode operation status indicates the size of the sleep window used at the reactivation.

For example, when the power saving class is reactivated, the above-mentioned setup information may include the reactivation code of "0b00", the reactivation code of "0b01", or the reactivation code of "0b10". The reactivation code of "0b00" determines whether an initial sleep window will be set by maintaining the previous sleep window increasing algorithm. The reactivation code of "0b01" determines whether the initial sleep window will be set when the sleep window is initialized and reactivated. The reactivation code of "0b10" determines whether a newly-defined sleep or listening window will be applied.

Operation (910)

If the base station (BS) receives the SLP-RSM message from the mobile station (MS), it may transmit the SLP_ACK message to the mobile station (MS). In this case, the base station (BS) may inform the mobile station (MS) of an activation time of the power saving class using a Start Frame parameter contained in the SLP-ACK message.

Operation (911)

If a current time reaches a reactivation frame of the power saving class, the mobile station (MS) reactivates the power saving class, and then maintains the power saving mode. In this case, a previous sleep window value or two times the previous sleep window value may be set to an initial sleep window of the reactivated power saving class on the basis of the sleep window update algorithm.

Operation (912)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode by operating the sleep window (x2) equal to next sleep window size.

Figure 10:
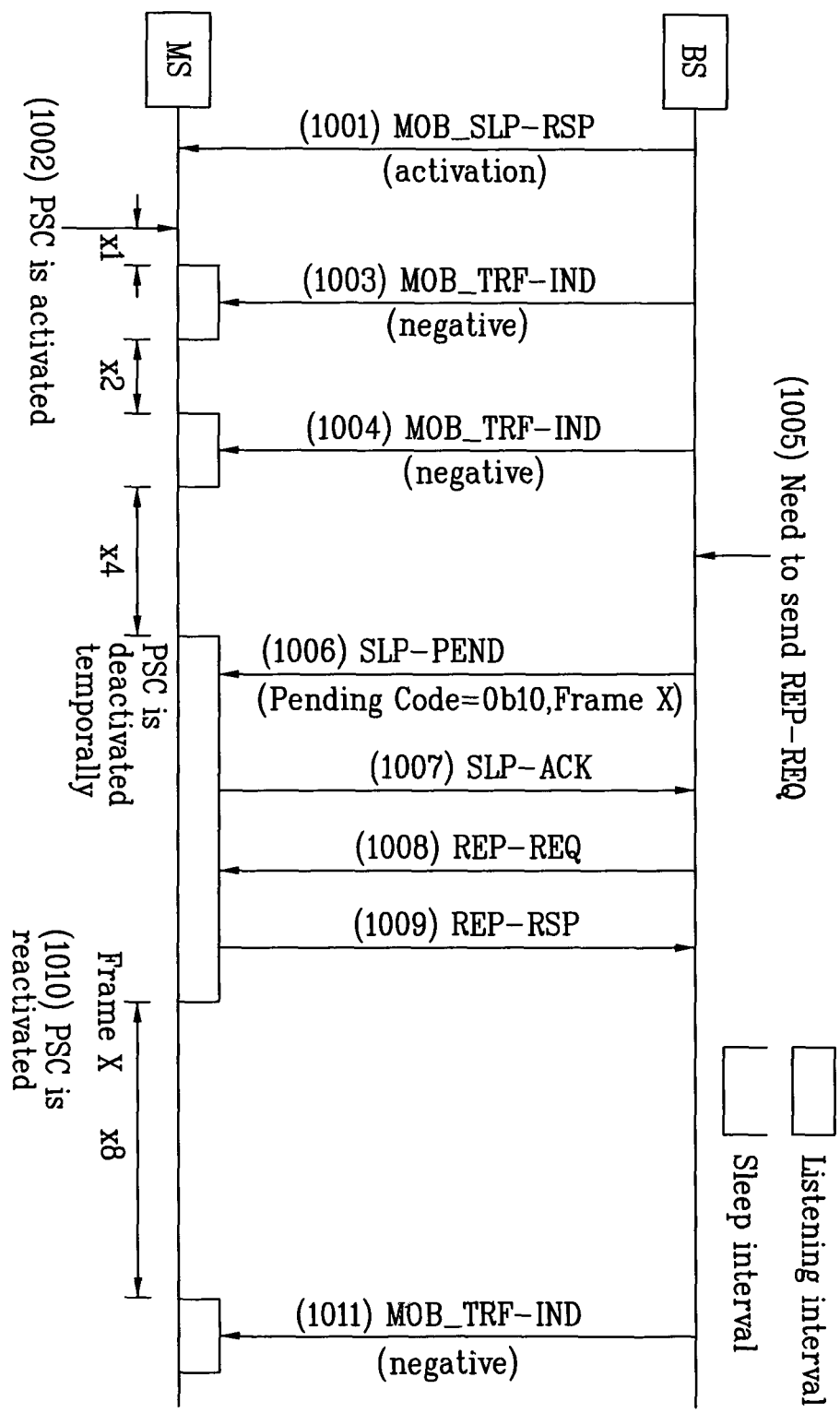
FIG. 10 is a conceptual diagram illustrating a further another embodiment of the present invention.

FIG. 10 is a conceptual diagram illustrating a further another embodiment of the present invention.

Referring to FIG. 10, the mobile station (MS) currently operated under the power saving mode during the downlink transmission temporarily deactivates the power saving class, and may transmit/receive the MAC control message. Differently from FIG. 8, the temporary deactivation window may be recognized by the SLP-PEND message. In other words, in this case, although the SLP-RSM message is not transmitted, the power saving class may be automatically reactivated if a current time reaches a corresponding time.

Operation (1001)

The base station (BS) transmits the MOD-SLP-RSP message to the mobile station (MS), activates the power saving class, and commands the mobile station (MS) to be shifted to the power saving mode. The MS shifting to the power saving mode by the MOD-SLP-RSP message may be transmitted as a response after the base station (BS) receives the MOD-SLP-REQ message from the mobile station (MS), and may be performed by the base station (BS) without receiving the request message of the mobile station (MS).

Operation (1002)

The mobile station (MS) operates the sleep window (x1) equal to the initial sleep window if a current time reaches a start time of the activation of the power saving class.

Operation (1003)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode during the sleep window (x2) equal to two times the initial sleep window.

Operation (1004)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode by operating the sleep window (x4) equal to two times tree previous initial sleep window.

Operation (1005)

If there is a need for the uplink MAC control message is transmitted to the mobile station (MS), the base station (BS) determines whether the downlink MAC control message (e.g., REP_REQ message) is needed to be transmitted to the mobile station (MS) operated under the power saving mode.

Operation (1006)

The base station (BS) transmits the SLP-PEND message to the mobile station (MS) during the listening window. In this case, the SLP-PEND message may use the message format shown in Table 6. According to the pending code setup value of the SLP-PEND message, the base station (BS) may temporarily deactivate the power saving class until receiving the SLP-RSM message, or may temporarily deactivate the power saving class during a predetermined time.

This embodiment relates to a method for transmitting frame information (e.g., frame number, Frame X) via the message and reactivating the power saving class in the corresponding frame time, from among methods for temporarily deactivating the power saving class during the predetermined time, as denoted by "pending code=0b10".

Operation (1007)

The mobile station (MS) transmits the SLP_ACK message to the base station (BS) after receiving the SLP-PEND message from the base station (BS), so that it may inform the base station (BS) of pending of the power saving class. The SLP_ACK message may use the message format using Table 8, or may use messages for transmitting ACK/NACK messages.

Operation (1008)

After the power saving class of the mobile station (MS) is temporarily deactivated, the base station (BS) transmits the downlink MAC control message (e.g., the REP_REQ message).

Operation (1009)

If the mobile station (MS) having received the downlink MAC control message from the base station (BS) must transmit the uplink MAC control message, it transmits the MAC control message (e.g., REP_RSP message). Although the MAC control messages are exchanged between the mobile station (MS) and the base station (BS), a deactivation status of the power saving class is maintained until a current time reaches a power saving class reactivation frame (i.e., a power saving class reactivation frame, Frame X) commanded by the SLP-PEND message.

Operation (1010)

If a current time reaches the power saving class reactivation frame (Frame X) commanded by the SLP-PEND message, which has been received at operation 1006, the mobile station (MS) reactivates the power saving class, and maintains the power saving mode.

In this case, the mobile station (MS) may include setup information of power saving mode operation status in a specific field of the SLP-RSM message. In this case the setup information of the power saving mode operation status indicates the size of the sleep window used at the reactivation.

For example, when the power saving class is reactivated, the above-mentioned setup information may include the reactivation code of "0b00", the reactivation code of "0b01", or the reactivation code of "0b10". The reactivation code of "0b00" determines whether an initial sleep window will be set by maintaining the previous sleep window increasing algorithm. The reactivation code of "0b01" determines whether the initial sleep window will be set when the sleep window is initialized and reactivated. The reactivation code of "0b10" determines whether a newly-defined sleep or listening window will be applied.

For example, if the reactivation code is set to "0b00", the previous algorithm will be maintained, so that the power saving mode is maintained during the sleep window (x8) of the sleep window equal to two times of the previous sleep window size formed prior to pending of the power saving class.

Operation (1011)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode by operating the sleep window (x16) equal to next sleep window.

Figure 11:
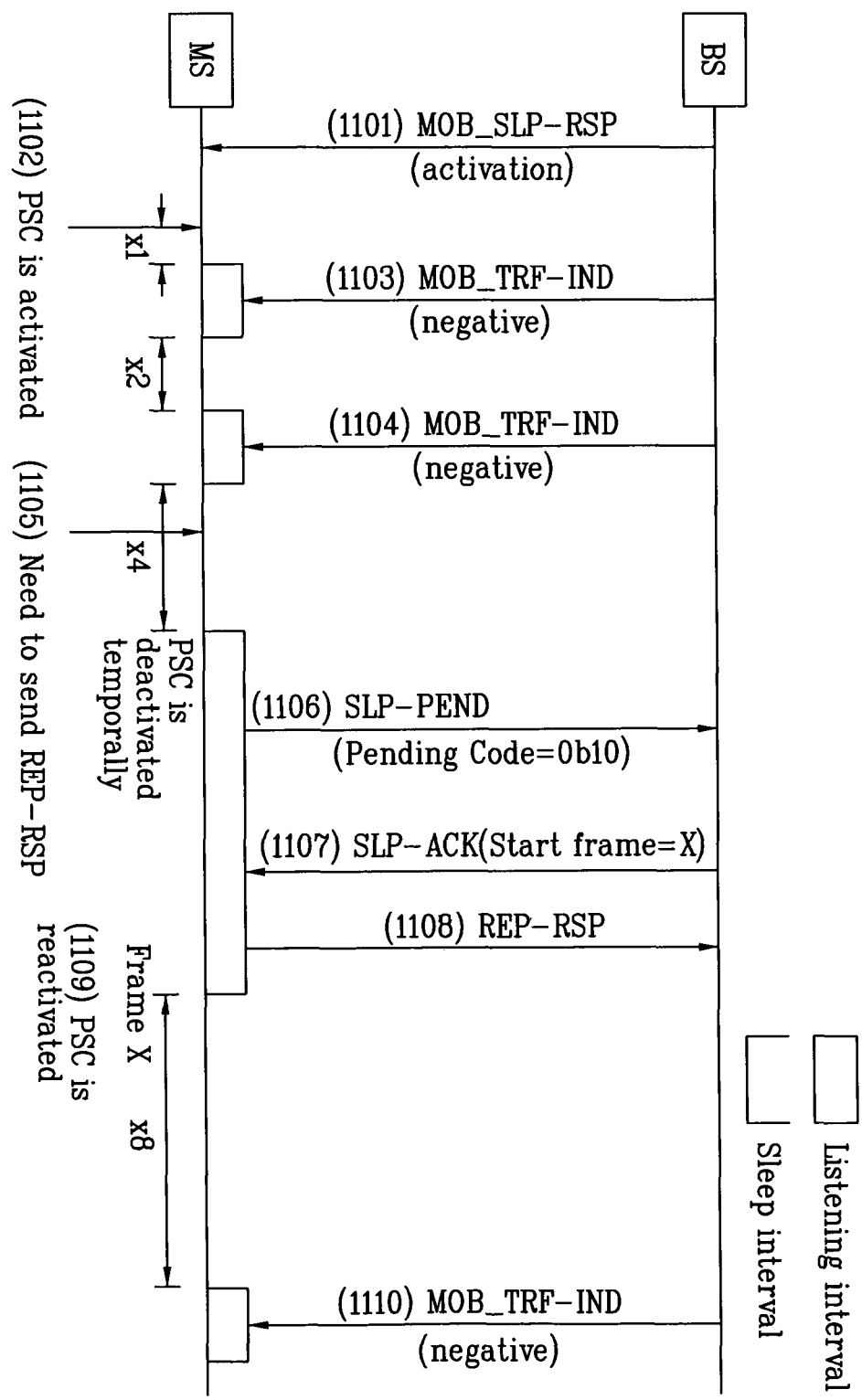
FIG. 11 is a conceptual diagram illustrating a further another embodiment of the present invention.

FIG. 11 is a conceptual diagram illustrating a further another embodiment of the present invention.

Referring to FIG. 11, the mobile station (MS) currently operated under the power saving mode during the uplink transmission temporarily deactivates the power saving class, and may transmit/receive the MAC control message. Differently from FIG. 9, the temporary deactivation window may be recognized by the SLP-PEND message. In other words, in this case, although the SLP-RSM message is not transmitted, the power saving class may be automatically reactivated if a current time reaches a corresponding time.

Operation (1101)

The base station (BS) transmits the MOD-SLP-RSP message to the mobile station (MS), activates the power saving class, and commands the mobile station (MS) to be shifted to the power saving mode. The MS shifting to the power saving mode by the MOD-SLP-RSP message may be transmitted as a response after the base station (BS) receives the MOD-SLP-REQ message from the mobile station (MS), and may be performed by the base station (BS) without receiving the request message of the mobile station (MS).

Operation (1102)

The mobile station (MS) operates the sleep window (x1) equal to the initial sleep window if a current time reaches a start time of the activation of the power saving class.

Operation (1103)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode by operating the sleep window (x2) equal to two times the initial sleep window.

Operation (1104)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode by operating the sleep window (x4) equal to two times the previous sleep window.

Operation (1105)

The mobile station (MS) operated under the power saving mode determines whether the uplink MAC control message (e.g., REP_RSP message) is needed to be transmitted.

Operation (1106)

If there is a need for the uplink MAC control message is transmitted to the base station (BS), the mobile station (MS) transmits the SLP-PEND message to the base station (BS). In this case, the SLP-PEND message may use the message format shown in Table 6. According to the pending code setup value of the SLP-PEND message, the mobile station (MS) may temporarily deactivate the power saving class until it transmits the SLP-RSM message, or may temporarily deactivate the power saving class during a predetermined time.

This embodiment relates to a method for sharing frame information (e.g., frame number, Frame X) by message exchange, and reactivating the power saving class during the corresponding frame time, from among methods for temporarily deactivating the power saving class during the predetermined time, as denoted by "pending code=0b10".

Operation (1107)

The base station (BS) transmits the SLP_ACK message to the base station (BS) after receiving the SLP-PEND message from the mobile station (MS), so that it may inform the mobile station (MS) of temporary deactivation of the power saving class. In this case, the base station (BS) may inform the mobile station (MS) of the reactivation time of the power saving class using a Start Frame parameter (Frame X). Also, the base station (BS) may use not only the SLP-ACK message but also the ACK/NACK messages.

Operation (1108)

The mobile station (MS) transmits the uplink MAC control message (e.g., REP_RSP message).

Operation (1109)

If a current time reaches a Frame X for reactivating the power saving class, the mobile station (MS) reactivates the power saving class, thereby maintains the power saving mode. If the power saving class is reactivated by the SLP-PEND message, the mobile station (MS) can receive minimum window status information.

For example, in the case of using the message format of Table 6, if the reactivation code is set to "0b00", a sleep-window update algorithm will be maintained, so that the sleep window equal to two times the previous sleep window may be set to the initial window of the reactivated power saving class. If the power saving class is reactivated, the mobile station (MS) maintains the power saving mode during the sleep window (x8) of the sleep window equal to two times of the previous sleep window size formed prior to pending of the power saving class.

Operation (1110)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode by operating the sleep window (x16) equal to next sleep window.

Figure 12:
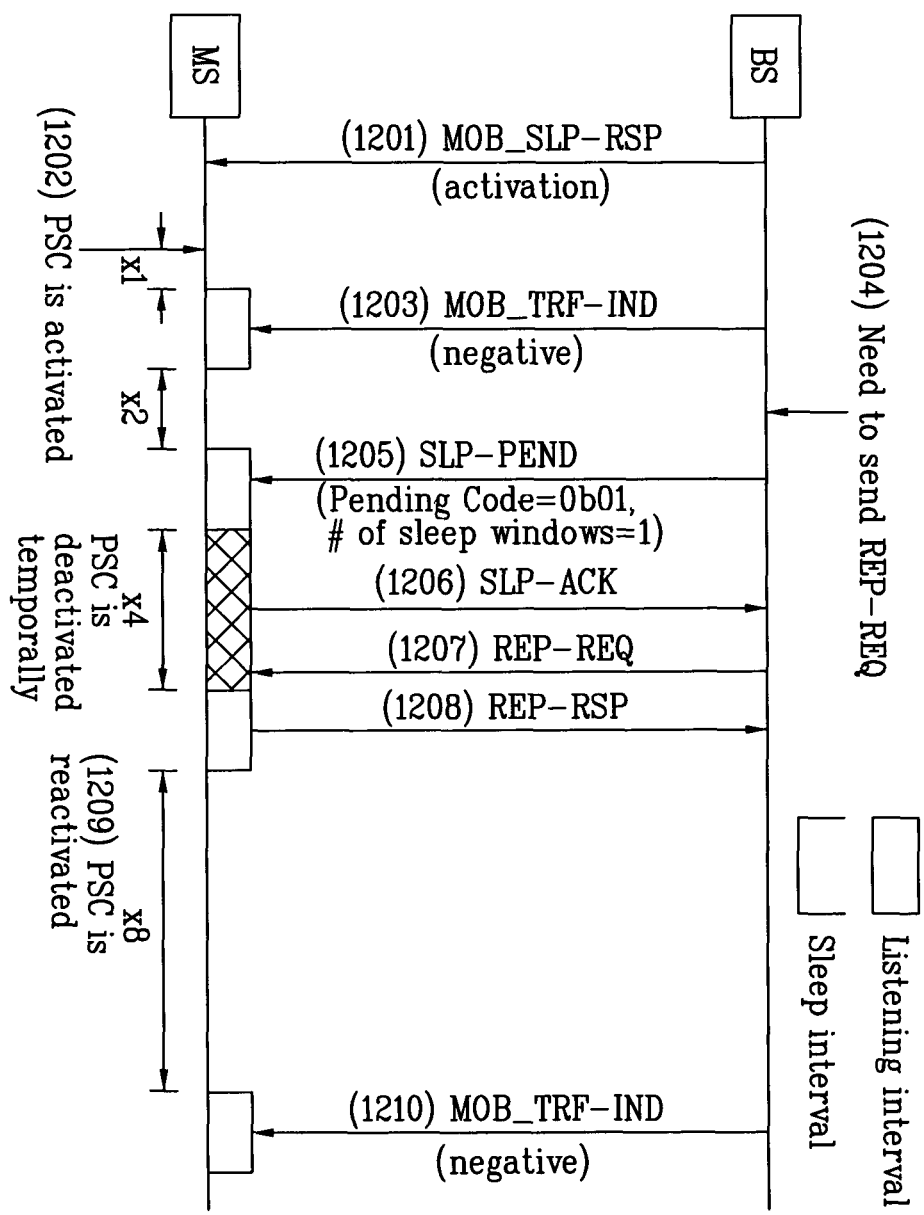
FIG. 12 is a conceptual diagram illustrating a further another embodiment of the present invention.

FIG. 12 is a conceptual diagram illustrating a further another embodiment of the present invention.

Referring to FIG. 12, the mobile station (MS) currently operated under the power saving mode during the downlink transmission temporarily deactivates the power saving class, and may transmit/receive the MAC control message. Similar to FIG. 11, the temporary deactivated window may be recognized by the SLP-PEND message. In other words, in this case, although the SLP-RSM message is not transmitted, the power saving class may be automatically reactivated if a current time reaches a corresponding time.

Differently from FIG. 11, information of the reactivation window may be indicated by the number of temporarily-deactivated sleep windows, instead of the number of frames. In other words, if the information indicating the number of sleep windows is transmitted to a corresponding mobile station (MS) by the SLP-PEND message, data transmission/reception can be conducted in the sleep window equal to the number of sleep windows after message transmission has been completed.

Operation (1201)

The base station (BS) transmits the MOD-SLP-RSP message to the mobile station (MS), activates the power saving class, and commands the mobile station (MS) to be shifted to the power saving mode. The MS shifting to the power saving mode by the MOD-SLP-RSP message may be transmitted as a response after the base station (BS) receives the MOD-SLP-REQ message from the mobile station (MS), and may be performed by the base station (BS) without receiving the request message of the mobile station (MS).

Operation (1202)

The mobile station (MS) maintains the sleep window (x1) equal to the initial sleep window if a current time reaches a start time of the activation of the power saving class.

Operation (1203)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode during the sleep window (x2) equal to two times the initial sleep window.

Operation (1204)

The base station (BS) determines whether the downlink MAC control message (e.g., REP_REQ message) is needed to be transmitted to the mobile station (MS) operated under the power saving mode.

Operation (1205)

If there is a need for the uplink MAC control message is transmitted to the mobile station (MS), the base station (BS) transmits the SLP-PEND message to the mobile station (MS) during the listening window. In this case, the SLP-PEND message may use the message format shown in Table 6. According to the pending code setup value of the SLP-PEND message, the base station (BS) may temporarily deactivate the power saving class until receiving the SLP-RSM message, or may temporarily deactivate the power saving class during a predetermined time.

This embodiment temporarily deactivates the power saving class during a predetermined time, and operates one or more successive sleep windows in the same manner as in the listening window, as denoted by "pending code=0b01". In other words, by the SLP-PEND message, the base station (BS) may inform the mobile station (MS) of the number of successive sleep, windows temporarily shifted to the listening window. The sleep windows temporarily shifted to the listening interval is hereinafter referred to as a temporary listening window. This embodiment discloses a specific case in which a single sleep window is set to a temporary listening window, as denoted by "number of sleep windows=1".

If a current times reaches the next sleep window (x8) from the above sleep window (i.e., the oblique-lined part of FIG. 12, x4) acting as the temporary listening window, the mobile station (MS) is operated again under the power saving mode. As described above, although the sleep window is changed to the temporary listening window, the sleep-window update algorithm can be maintained without any changes.

Operation (1206)

The mobile station (MS) transmits the SLP_ACK message to the base station (BS) after receiving the SLP-PEND message from the base station (BS), so that it may inform the base station (BS) of deactivation of the power saving class. The SLP_ACK message may use the message format using Table 8.

Operation (1207)

The mobile station (MS) may receive the downlink MAC control message (e.g., the REP_REQ message) from the base station (BS) during the temporary listening window (x4).

Operation (1208)

If the mobile station (MS) having received the downlink MAC control message from the base station (BS) must transmit the uplink MAC control message, it transmits the MAC control message (e.g., REP_RSP message) to the base station (BS) during the listening window or the temporary listening window. During the temporary listening window commanded by the SLP-PEND message, the mobile station (MS) and the base station (BS) maintain the power saving class pending status.

Operation (1209)

After the sleep window equal to the number of sleep windows commanded by the SLP-PEND message of the Operation 1205 has elapsed, the mobile station (MS) reactivates the power saving class, and maintains the power saving mode.

In this case, the mobile station (MS) may include setup information of power saving mode operation status in a specific field of the SLP-RSM message. In this case the setup information of the power saving mode operation status indicates the size of the sleep window used at the reactivation.

For example, when the power saving class is reactivated, the above-mentioned setup information may include the reactivation code of "0b00", the reactivation code of "0b01", or the reactivation code of "0b10". The reactivation code of "0b00" determines whether an initial sleep window will be set by maintaining the previous sleep window increasing algorithm. The reactivation code of "0b01" determines whether the initial sleep window will be set when the sleep window is initialized and reactivated. The reactivation code of "0b10" determines whether a newly-defined sleep or listening window will be applied.

For example, if the reactivation code is set to "0b00", the previous algorithm will be maintained, so that the power saving mode is maintained during the sleep window (x8) of the sleep window equal to two times of the previous sleep window size formed prior to pending of the power saving class.

Operation (1210)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode by operating the sleep window (x16) equal to two times the previous sleep window.

Figure 13:
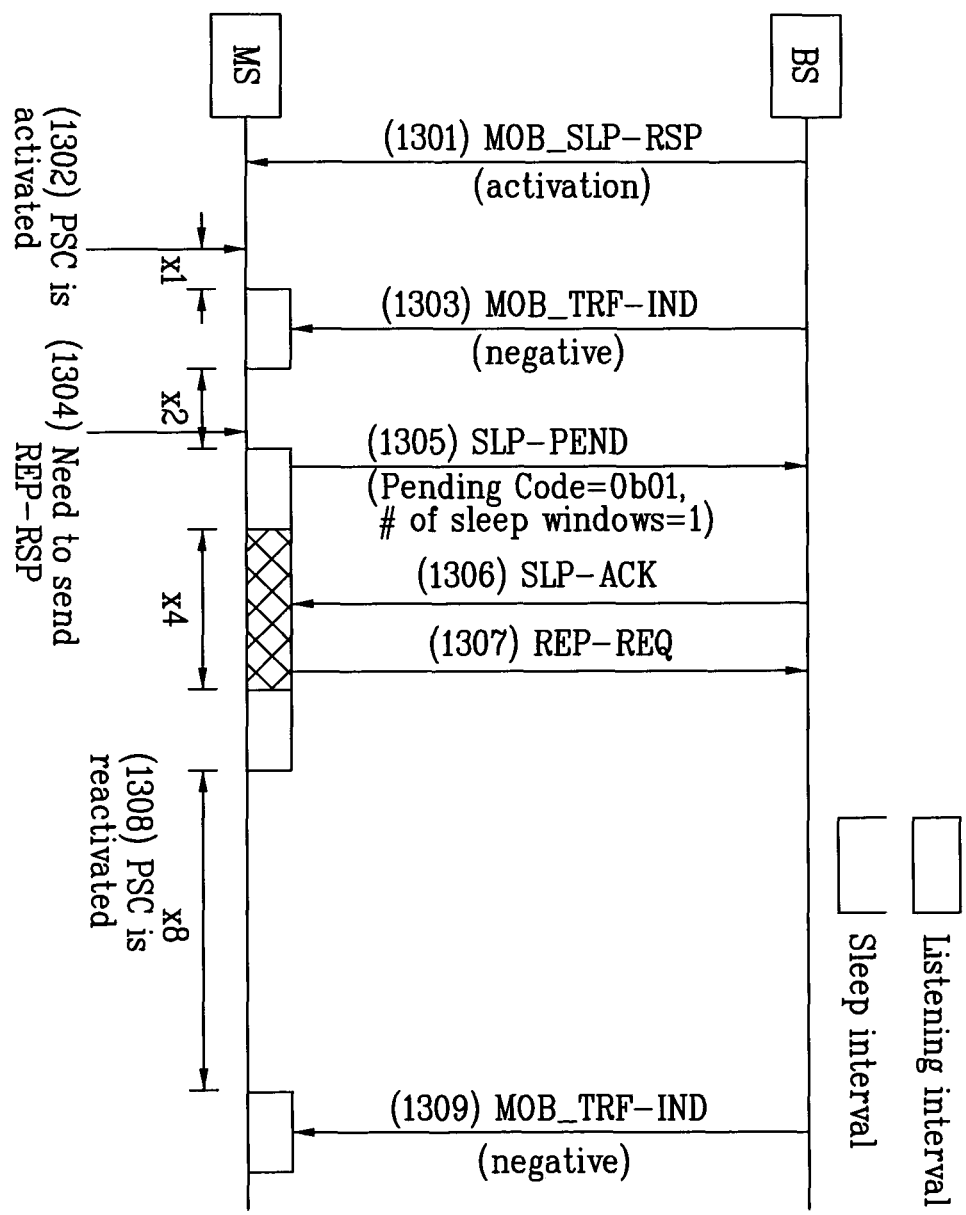
FIG. 13 is a conceptual diagram illustrating a further another embodiment of the present invention.

FIG. 13 is a conceptual diagram illustrating a further another embodiment of the present invention.

Referring to FIG. 13, the mobile station (MS) currently operated under the power saving mode during the uplink transmission temporarily deactivates the power saving class, and may transmit/receive the MAC control message. Similar to FIG. 11, the temporary deactivation window may be recognized by the SLP-PEND message. In other words, in this case, although the SLP-RSM message is not transmitted, the power saving class may be automatically reactivated if a current time reaches a corresponding time.

Differently from FIG. 11, information of the reactivation window may be indicated by the number of temporarily-deactivated sleep windows, instead of the number of frames. In other words, if the information indicating the number of sleep windows is transmitted to a corresponding mobile station (MS) by the SLP-PEND message, data transmission/reception can be conducted in the sleep window equal to the number of sleep windows after message transmission has been completed.

Operation (1301)

The base station (BS) transmits the MOD-SLP-RSP message to the mobile station (MS), activates the power saving class, and commands the mobile station (MS) to be shifted to the power saving mode. The MS shifting to the power saving mode by the MOD-SLP-RSP message may be transmitted as a response after the base station (BS) receives the MOD-SLP-REQ message from the mobile station (MS), and may be performed by the base station (BS) without receiving the request message of the mobile station (MS).

Operation (1302)

The mobile station (MS) maintains the sleep window (x1) equal to the initial sleep window if a current time reaches a start time of the activation of the power saving class.

Operation (1303)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode by operating the sleep window (x2) equal to two times the initial sleep window.

Operation (1304)

The mobile station (MS) operated under the power saving mode determines whether the uplink MAC control message is needed to be transmitted to the base station (BS).

Operation (1305)

If there is a need for the uplink MAC control message is transmitted to the base station (BS), the mobile station (MS) transmits the SLP-PEND message to the base station (BS). In this case, the SLP-PEND message may use the message format shown in Table 6. According to the pending code setup value of the SLP-PEND message, the mobile station (MS) may temporarily deactivate the power saving class until receiving the SLP-RSM message, or may temporarily deactivate the power saving class during a predetermined time.

This embodiment temporarily deactivates the power saving class during a predetermined time, and operates one or more successive sleep windows in the same manner as in the listening window, as denoted by "pending code=0b01". In other words, by the SLP-PEND message, the base station (BS) may information the mobile station (MS) of the number of successive sleep windows temporarily shifted to the listening window. The sleep windows temporarily shifted to the listening window is hereinafter referred to as a temporary listening window.

This embodiment discloses a specific case in which a single sleep window is set to a temporary listening window, as denoted by "number of sleep windows=1". If a current times reaches the next sleep window (x8) from the above sleep window (i.e., the oblique-lined part of FIG. 12, x4) acting as the temporary listening window, the mobile station (MS) is operated again under the power saving mode. As described above, although the sleep window is changed to the temporary listening window, the sleep-window update algorithm can be maintained without any changes.

Operation (1306)

The mobile station (MS) transmits the SLP_ACK message to the base station (BS) after receiving the SLP-PEND message from the base station (BS), so that it may inform the base station (BS) of pending of the power saving class. The SLP_ACK message may use the message format using Table 8.

Operation (1307)

The mobile station (MS) may transmit the uplink MAC control message (e.g., the REP_RSP message) to the base station (BS) during either the temporary listening window (x4) or the original listening window. If the base station (BS) having received the uplink MAC control message from the mobile station (MS) transmits the uplink MAC control message, it transmits the MAC control message to the mobile station (MS) during the listening window which has been set to the temporary listening window.

During the temporary listening window commanded by the SLP-PEND message, the mobile station (MS) and the base station (BS) maintain the power saving class pending status.

Operation (1308)

After the sleep window equal to the number of sleep windows commanded by the SLP-PEND message of the Operation 1305 has elapsed, the mobile station (MS) reactivates the power saving class, thereby maintains the power saving mode.

In this case, the mobile station (MS) may include setup information of power saving mode operation status in a specific field of the SLP-RSM message. In this case the setup information of the power saving mode operation status indicates the size of the sleep window used at the reactivation.

For example, when the power saving class is reactivated, the above-mentioned setup information may include the reactivation code of "0b00", the reactivation code of "0b01", or the reactivation code of "0b10". The reactivation code of "0b00" determines whether an initial sleep window will be set by maintaining the previous sleep window increasing algorithm. The reactivation code of "0b01" determines whether the initial sleep window will be set when the sleep window is initialized and reactivated. The reactivation code of "0b10" determines whether a newly-defined sleep or listening window will be applied.

For example, if the reactivation code is set to "0b00", the previous algorithm will be maintained, so that the power saving mode is maintained by operating the sleep window (x8) of the sleep window equal to two times of the previous sleep window size formed prior to deactivation of the power saving class.

Operation (1309)

If the sleep window has expired, the mobile station (MS) receives the MOD-TRF-IND message from the base station (BS) during the listening window. If there is no downlink traffic toward the mobile station (MS) (i.e., if a negative indication is determined), the mobile station (MS) maintains the power saving mode during the sleep window (x16) equal to two times the previous sleep window.

According to the above-mentioned embodiments shown in FIGS. 6~13, the MAC management connection for transmitting/receiving the control messages is mapped to the power saving class, so that the corresponding power saving class is activated. Namely, the above-mentioned embodiments shown in FIGS. 6~13 show the activated power saving class (PSC).

Figure 14:
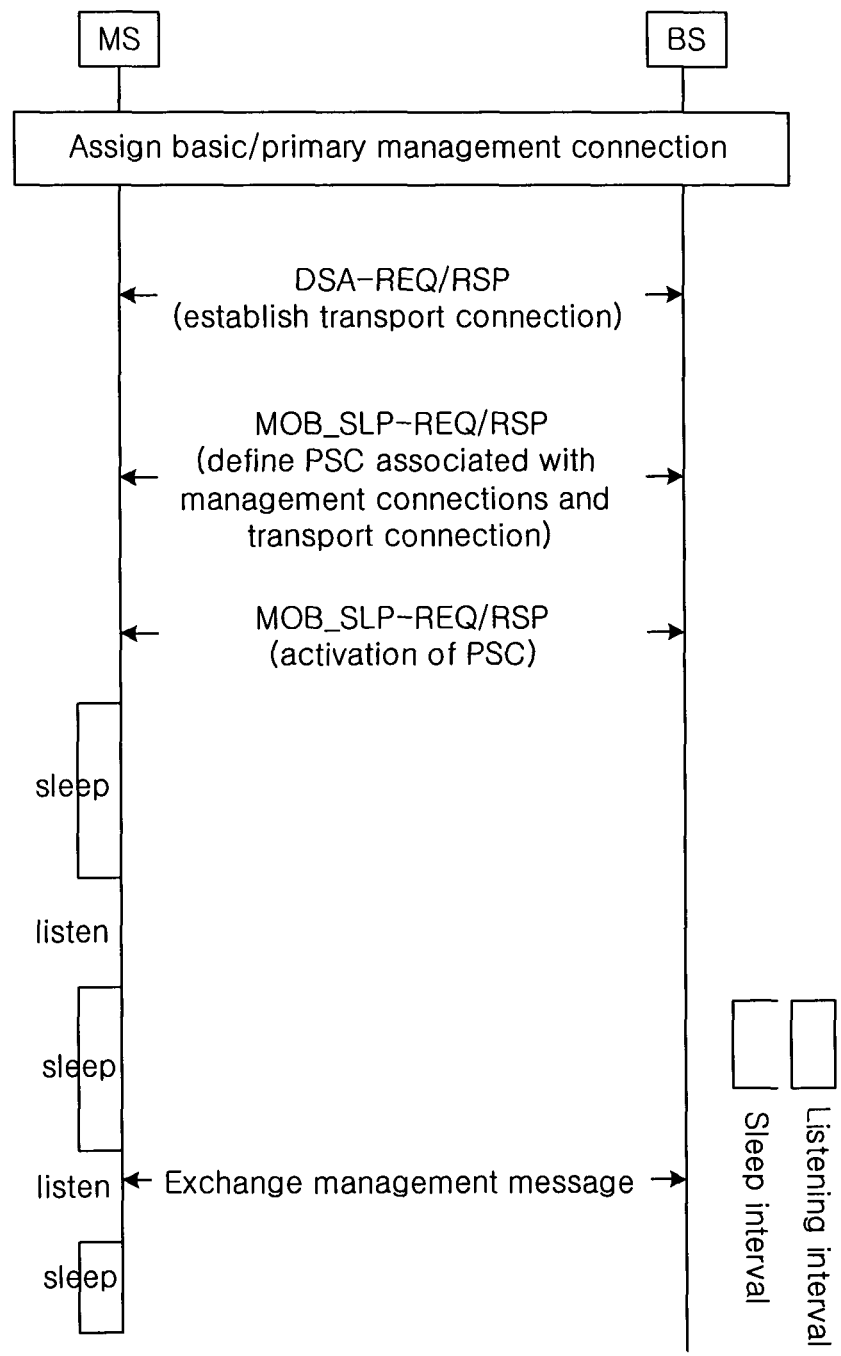
FIG. 14 is a flow chart illustrating a method to activate the power saving class in consideration with the MAC management connection.

FIG. 14 is a flow chart illustrating method to activate the power saving class in consideration with the MAC management connection.

According to the embodiment, the MAC management connection of the mobile station (MS) to transmit/receive the control message does not activate the power saving class alone although it is mapped to the power saving class, and may consider other transmission connections and associated power saving classes as necessary.

For example, in order to activate the power saving class mapped to the MAC management connection for transmission/reception of control messages, the present embodiment may consider not only the MAC management connection but also other transmission connections for transmission of user data. In other words, if not only the MAC management connection but also another transmission connection for user-data transmission is mapped to a corresponding power saving class, and the activation condition of the power saving class for a corresponding transmission connection is satisfied, the power saving class mapped to the MAC management connection can be activated.

In this way, the control message transmitted by the MAC management connection after the power saving class has been activated can be transmitted or received according to a corresponding power saving class listening window. This concept is extended in the present invention, so that the extended concept can be operated in the same manner as in FIGS. 6~13.

Figure 15:
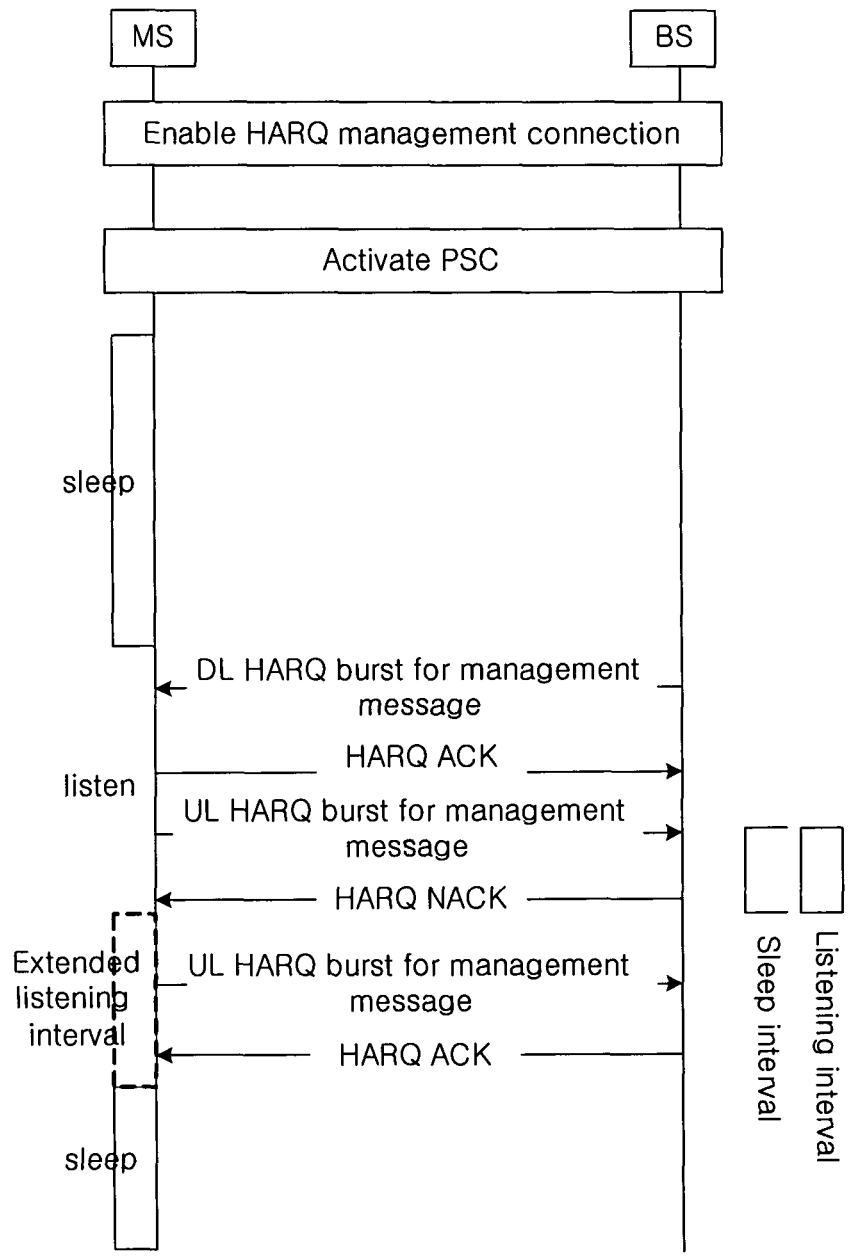
FIG. 15 is a conceptual diagram illustrating a further another embodiment of the present invention.

FIG. 15 is a conceptual diagram illustrating a further another embodiment of the present invention.

The embodiment of FIG. 15 provides a method for extending the listening window when the power saving class of the MAC management connection is activated. For example, if the power saving class is activated, the mobile station (MS) transmits or receives data or messages during the listening window. The mobile station (MS) does not enter the sleep mode until confirming correct transmission/reception of data, and extends the listening window.

FIG. 15 shows the listening window extended when the HARQ is operated. If the MAC management connection for the HARQ operation is mapped to the power saving class, and a corresponding power saving class is activated, the mobile station (MS) and the base station (BS) can transmit or receive MAC management messages during the listening window of the mobile station (MS) as shown in FIG. 15.

In this case, the MAC management message is transmitted in the form of a HARQ burst, and the listening window is extended until an ACK message associated with the MAC management message is received from a reception end.

After the MAC management message is transmitted to an uplink during the listening window, the listening window is extended until a response message to the MAC management message is received. In this case, the listening window can be extended until the HARQ ACK message for the HARQ burst is received. If the transmission end does not receive the response message until a current number exceeds a maximum number of HARQ retransmission times, or pre-receives the HARQ ACK message, the mobile station (MS) may enter the sleep window.

FIG. 15 exemplarily shows HARQ burst transmission or a power saving mode caused by HARQ ACK/NACK messages in association with the uplink MAC management message. The embodiment of FIG. 15 can also be applied to the downlink MAC management messages.

The embodiments of FIGS. 6-13 will disclose that the Power Saving Mode Class of type 1 is basically activated as described above. However, it is obvious to those skilled in the art that the same or similar technical concepts can be applied to not only activation of the inventive power saving class but also activation of other power saving classes.

In other words, if Tx/Rx data (e.g., MAC control messages) occurs in the power saving mode MS caused by an arbitrary power saving class, the present invention may use the listening window while maintaining the power saving mode, instead of transmitting/receiving the data, after the power saving class has been completely deactivated, or may temporarily deactivate the power saving class.

In order to enter the temporarily deactivation status, the present invention may transmit the SLP-PEND message. In order to reactivate the power saving class, the present invention may transmit the SLP-RSM message. The present invention includes reactivation time information of the power saving class in the SLP-PEND message, and transmits the resultant SLP-PEND message, so that the power saving class can be reactivated without transmission of additional SLP-RSM messages. In this case, the above-mentioned time information may be information of a reactivation start frame, or may be information of a sleep window (i.e., a sleep window) acting as a temporary listening window.

Specifically, the above-mentioned embodiments may additionally define the SLP-PEND message, the SLP-RSM message, and the SLP-ACK message to allow the MAC control message to be communicated between the mobile station (MS) and the base station (BS). However, the above-mentioned embodiments may use a downlink sub-header or an uplink header. In other words, necessary information for controlling the sleep mode is contained in the downlink sub-header, so that the resultant message is transmitted. Necessary information for controlling the sleep mode is contained in the uplink sub-header, so that the resultant message is transmitted.

As a result, the same or similar effects can be acquired. In this case, the header including necessary information for controlling the sleep mode may be called a control header, or the sub-header including the same necessary information may be called a sleep-mode control sub-header. In this case, the format of Table 9 or 10 may be used.

The above-mentioned embodiments have disclosed the method for allowing the MAC control message to be communicated between the mobile station (MS) of the power saving mode and the base station (BS). The method for pending or resuming the sleep mode may be applied to not only the MAC control message but also a short packet exchanged between the mobile station (MS) and the base station (BS).

Although the Best Effort or non-real-time service data instead of the MAC control message occurs, the Best Effort or non-real-time service data can be communicated between the mobile station (MS) and the base station (BS) after the power saving class has been deactivated.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the present invention can be applied to a wireless access system, a wireless communication system, and a mobile communication system.

The present invention differently defines operations of power saving modes of individual cases by discriminating traffic categories, so that it can effectively reduce power consumption of the mobile station (MS).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for controlling a sleep mode of a device in a wireless access system, the method comprising:
  transmitting, by the device, a sleep request message for requesting to enter the sleep mode;

in response to the sleep request message, receiving, by the device, a sleep response message for allowing entry into the sleep mode, wherein a cycle of the sleep mode comprises a sleep window and a listening window;

entering, by the device, the sleep mode; and transmitting, by the device, traffic during the listening window of the sleep mode, wherein, if a HARQ NACK (Hybrid Automatic Retransmit reQuest Negative-Acknowledge) message is received in response to the traffic, the listening window is extended until a HARQ ACK (Hybrid Automatic Retransmit reQuest Acknowledge) message is received in response to the traffic.

2. The method according to claim 1, wherein:
the traffic is a Media Access Control (MAC) control message traffic.

3. The method according to claim 1, wherein the listening window is extended until a number of retransmissions of the traffic reaches a maximum number of retransmissions.

4. The method according to claim 1, further comprising:
receiving a traffic indication message indicating whether the traffic is transmitted during the listening window,
wherein the cycle of the sleep mode is updated if there is a negative indication in the traffic indication message.

5. A method for controlling a sleep mode of a first device by a second device in a wireless access system, the method comprising:

receiving, by the second device, a sleep request message from the first device for requesting to enter the sleep mode;

in response to the sleep request message, transmitting, by the second device, a sleep response message to the first device for allowing entry into the sleep mode, wherein a cycle of the sleep mode comprises a sleep window and a listening window; and receiving, by the second device, traffic from the first device during the listening window of the sleep mode, wherein, if a HARQ NACK (Hybrid Automatic Retransmit reQuest Negative-Acknowledge) message is transmitted in response to the traffic, the listening window is extended until a HARQ ACK (Hybrid Automatic Retransmit reQuest Acknowledge) message is transmitted in response to the traffic.

6. The method according to claim 5, wherein:
the listening window is extended until a number of retransmissions of the traffic reaches a maximum number of retransmissions.

7. The method according to claim 5, further comprising:
transmitting a traffic indication message indicating whether the traffic is transmitted during the listening window,
wherein the cycle of the sleep mode is updated if there is a negative indication in the traffic indication message.

* * * * *